(12) United States Patent
Telep et al.

(10) Patent No.: US 10,473,232 B2
(45) Date of Patent: Nov. 12, 2019

(54) SPLIT LINKAGE MECHANISM FOR VALVE ASSEMBLY

(71) Applicant: BORGWARNER INC., Auburn Hills, MI (US)

(72) Inventors: Robert J. Telep, Livonia, MI (US); Robert D. Keefover, Lake Orion, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/405,630

(22) Filed: Jan. 13, 2017

(65) Prior Publication Data
US 2018/0202575 A1 Jul. 19, 2018

(51) Int. Cl.
| | |
|---|---|
| *F02M 26/52* | (2016.01) |
| *F16K 31/53* | (2006.01) |
| *F02M 26/68* | (2016.01) |
| *F16K 31/60* | (2006.01) |
| *F16K 31/524* | (2006.01) |

(52) U.S. Cl.
CPC .............. *F16K 31/53* (2013.01); *F02M 26/52* (2016.02); *F02M 26/68* (2016.02); *F16K 31/5245* (2013.01); *F16K 31/602* (2013.01)

(58) Field of Classification Search
CPC ................................ F02M 26/52; F02M 26/68
USPC ......... 251/248, 251, 259, 260, 249.5, 250.5; 123/90.2, 90.26, 90.28, 90.6
See application file for complete search history.

(56) References Cited

U.S. PATENT DOCUMENTS

| | | | | |
|---|---|---|---|---|
| 4,723,515 | A * | 2/1988 | Burandt ................... | F01L 1/30 123/90.16 |
| 4,898,130 | A * | 2/1990 | Parsons .................... | F01L 1/10 123/90.16 |
| 6,382,195 | B1 | 5/2002 | Green et al. | |
| 7,086,636 | B2 | 8/2006 | Telep et al. | |
| 7,104,523 | B2 | 9/2006 | Busato et al. | |
| 7,487,789 | B2 | 2/2009 | Telep et al. | |
| 7,546,823 | B2 * | 6/2009 | Buelna ..................... | F01L 1/14 123/90.16 |

(Continued)

*Primary Examiner* — Marina A Tietjen
*Assistant Examiner* — Paul J Gray
(74) *Attorney, Agent, or Firm* — Howard & Howard Attorneys PLLC

(57) ABSTRACT

A linkage mechanism for a valve assembly includes one of a slot and an engagement component operably coupled to at least one drive component and located eccentrically from a rotational axis of the at least one drive component, a link operably coupled to one end of a valve stem of a valve member and being moveable with the valve stem, the link having another one of a slot and an engagement component, and a rotatable lever coupled to at least one housing, the lever including one of a first slot and a first engagement component operably engaged with the one of the slot and the engagement component of the at least one drive component and one of a second slot and a second engagement component operably engaged with the one of the slot and the engagement component of the link, wherein rotation of the at least one drive component causes the lever to rotate to convert a rotational movement of the at least one drive component to a linear movement of the link such that the link, the valve stem, and the valve member are moved axially in a direction along a longitudinal axis of the valve stem.

18 Claims, 18 Drawing Sheets

(56) References Cited

U.S. PATENT DOCUMENTS

| | | |
|---|---|---|
| 7,607,638 B2 | 11/2009 | Wilson et al. |
| 7,950,377 B2 | 5/2011 | Busato et al. |
| 8,181,545 B2 | 5/2012 | Keefover et al. |
| 8,803,388 B2 | 8/2014 | Keefover et al. |
| 9,353,706 B2 | 6/2016 | Telep et al. |
| 2015/0102244 A1 | 4/2015 | Telep et al. |
| 2016/0215862 A1 | 7/2016 | Telep et al. |
| 2016/0215889 A1 | 7/2016 | McAuliffe et al. |

\* cited by examiner

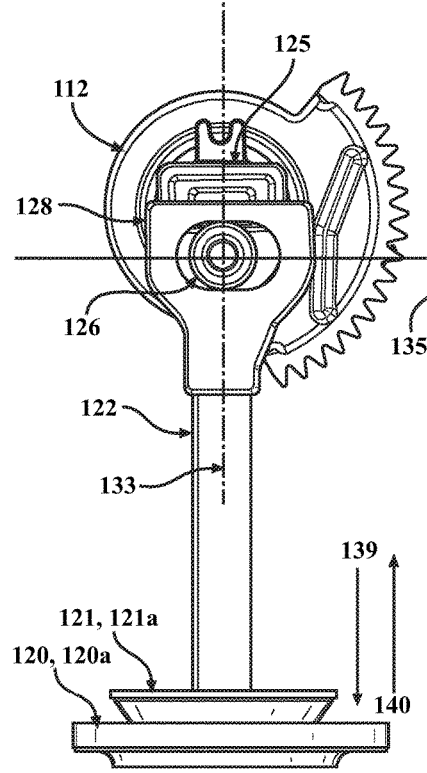
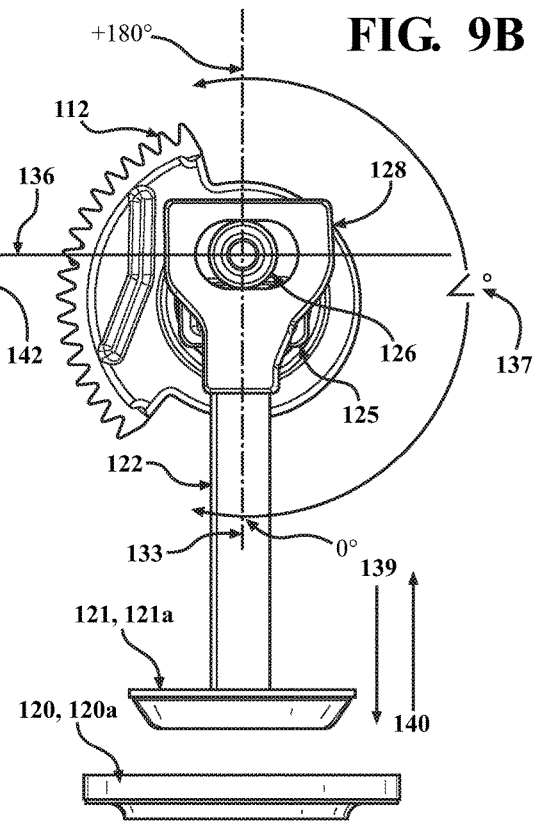
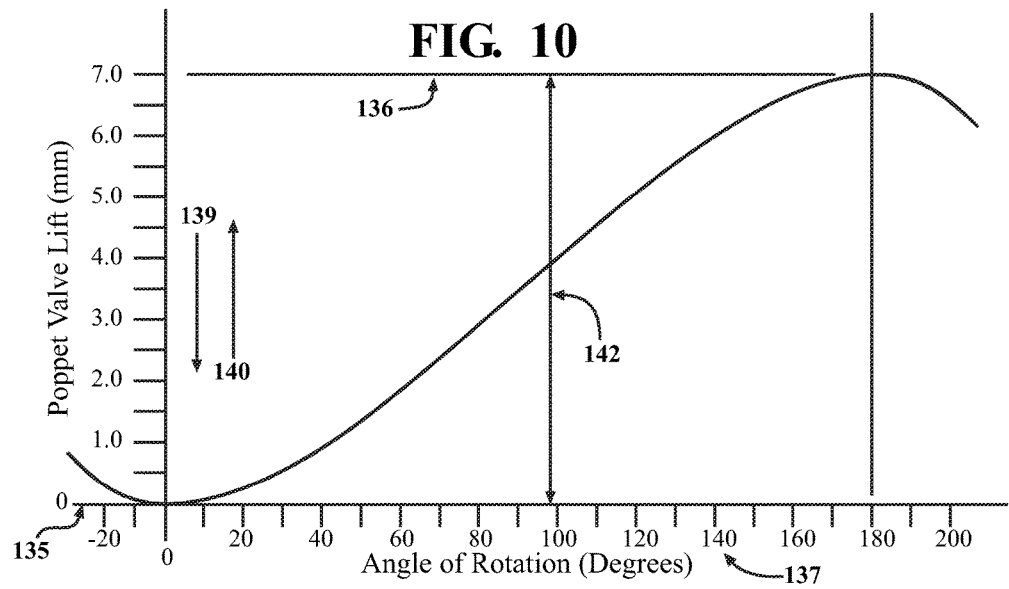

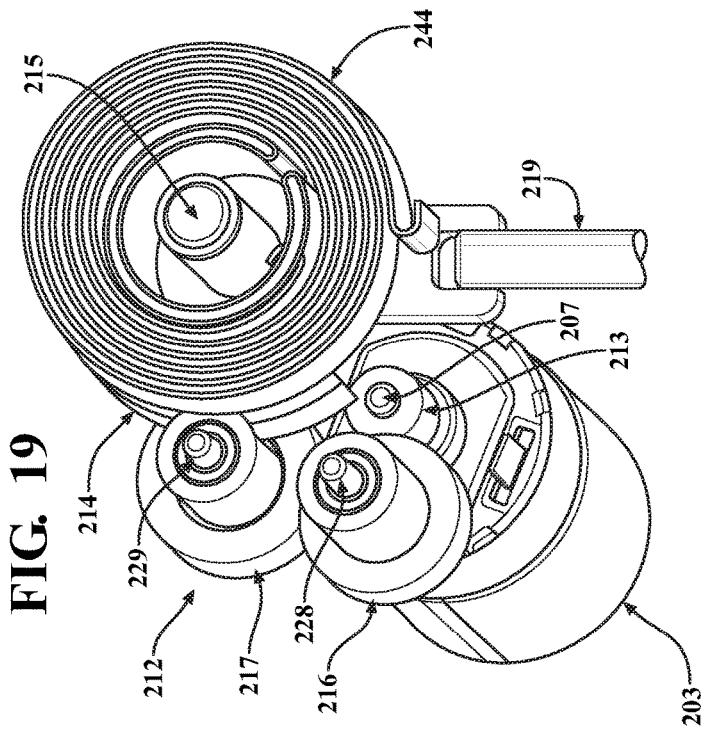
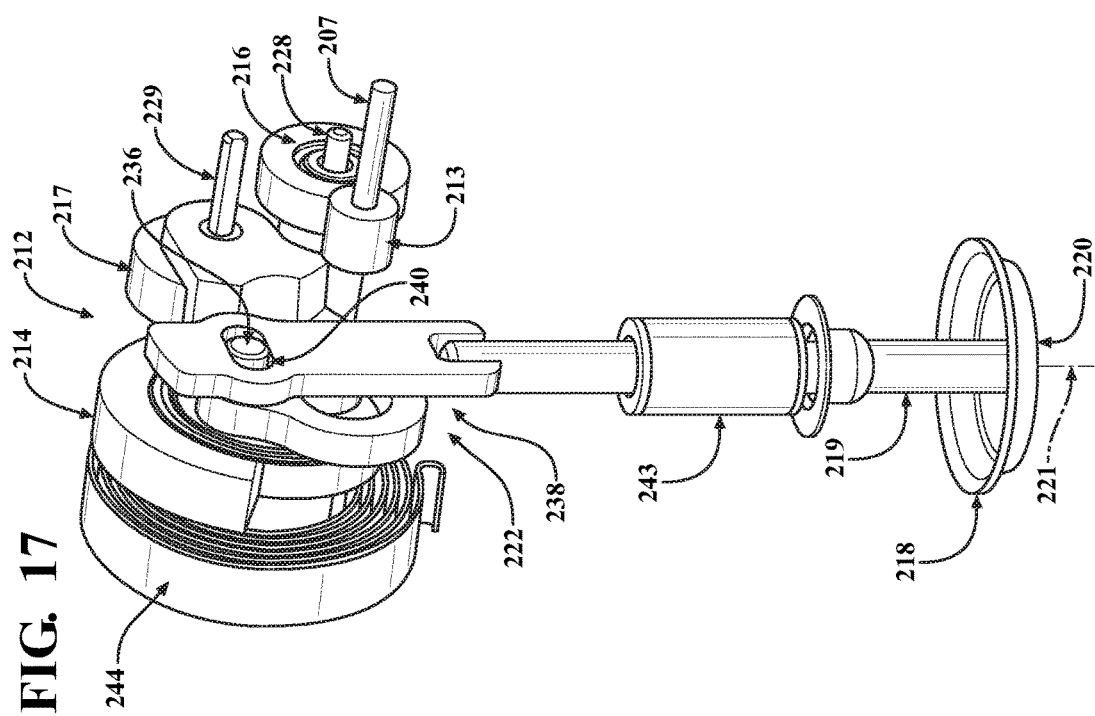

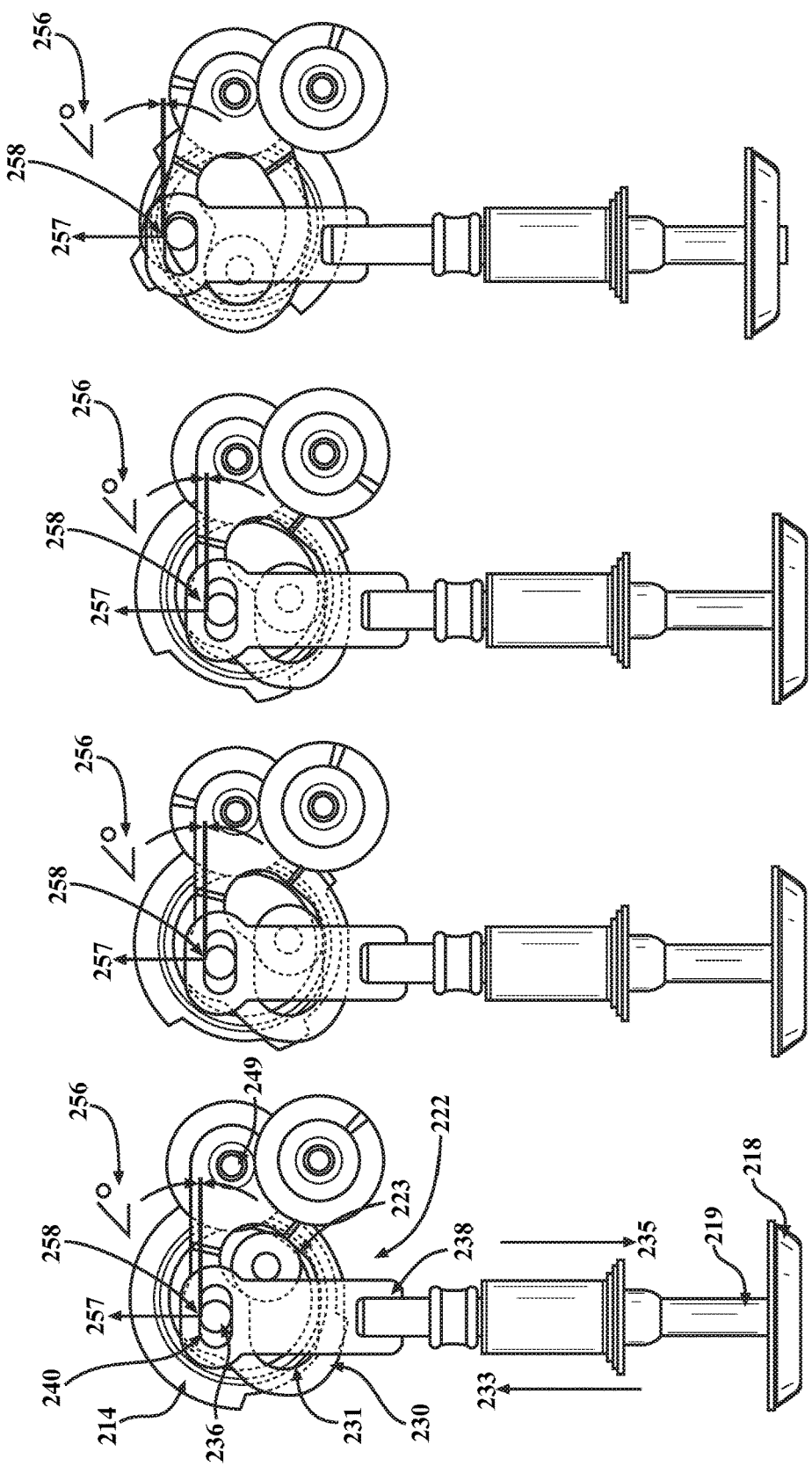

SPLIT LINKAGE MECHANISM FOR VALVE ASSEMBLY

BACKGROUND OF INVENTION

1. Field of Invention

The present invention relates generally to valves such as an air throttle valve, exhaust gas recirculation (EGR) valve, exhaust throttle valve, bypass valve, turbo waste gate valve, or recirculation valve used for vehicles and, more specifically, to a linkage mechanism for a valve assembly used in a vehicle that may afford improved performance over a range of operation of the valve assembly.

2. Description of the Related Art

Control of vehicle engine exhaust emissions and meeting fuel economy standards are mandatory requirements in most countries. Oxides of Nitrogen (NOx) and particulate matter are two components of the engine exhaust emissions that must be controlled.

Formation of NOx may occur at higher engine combustion temperatures and particulates may form at lower combustion temperatures. A system, referred to as an exhaust gas recirculation (EGR) system, has been developed to control combustion temperatures, NOx, and particulate emissions. In a typical EGR system, a portion of the exhaust gas is recirculated back to an intake manifold where it may be combined with incoming air and fuel. The exhaust gas portion of the mixture may not support combustion and, when this mixture is compressed and ignited in a cylinder of the engine, the exhaust gas may control the combustion temperature and limit the formation of NOx and particulate in the exhaust emissions.

The EGR system typically includes an EGR valve assembly having a valve and an actuator for actuation of the valve. The type of actuator and valve may be determined, in part, by the type of engine and EGR system used for emission controls or fuel economy. For example, the exhaust gas from a diesel engine may contain high amounts of residue that can form a sticky lacquer like substance that may provide resistance to opening of the valve. A higher force actuator, in excess of 300N, may be required to open the valve. D.C. motor actuators with multi-stage drives have been used for actuation of the valve in these EGR valve assemblies.

In another example, the exhaust gas from a gasoline engine may contain a lesser degree of residue due, in part, to the higher exhaust temperatures and chemical reaction during combustion. The operating force of the actuator may be substantially less for these engines. Linear solenoid actuators have been used for actuation of the valve in some of these EGR valve assemblies and their typical operating forces may range from 20N to 2N between the open and closed valve positions.

Advances in engine technology such as high pressure turbocharging may place increasing demands on valve capabilities. Not only must valves withstand these higher pressures, they also must remain closed in the event of an electrical failure. Contemporary EGR valve assemblies typically include a valve, for example a poppet valve, that is electrically operated, usually by a DC motor, a gear train, and a final linkage mechanism. Some EGR valve assemblies may incorporate a valve seat in a mating component that positions the valve downstream of the seat. The actuator must then "pull" the valve to open. Since the pneumatic force of the exhaust gas is now in the direction of opening of the valve, the actuator of the EGR valve assembly must be able to resist this force, especially in the case of an electrical failure. Therefore, it is desireable that the actuator of the valve for the EGR valve assembly be able to accommodate the inevitable tolerance stackup of the seat position relative to the valve.

A popular rotary-to-linear linkage mechanism is a scotch yoke, which is an eccentric pin (or ball bearing) and a horizontal slot. The output is simple harmonic motion (SHM). This has the desirable characteristic of a low lift-to-angle slope at the valve closed and low opening region. The eccentric position at the closed valve ("initial position") must be some angle from the limiting position to seat the valve. This low starting angle achieves good low flow resolution, high opening force, and good anti-backdrive capability. If this starting angle is too low, the slope approaches zero at the limiting position of the eccentric. This means the linkage mechanism is incapable of accommodating any significant tolerance stackup, especially if the valve seat is in a mating part, and the valve will fail to reach the seat. Conversely, if the starting angle is too high, the anti-backdrive feature will be diminished, and the valve may be subject to blowing open at high delta pressures. A workable design to accommodate these issues would need an increased performance margin. This translates to a larger motor, return spring, package size, and cost. Thus, there is a need in the art to provide a linkage mechanism for actuating a valve in a valve assembly that overcomes these issues.

SUMMARY OF THE INVENTION

The present invention provides a linkage mechanism for a valve assembly including one of a slot and an engagement component operably coupled to at least one drive component of the valve assembly and located eccentrically from a rotational axis of the at least one drive component. The linkage mechanism also includes a link operably coupled to one end of a valve stem of a valve member of the valve assembly and being moveable with the valve stem, the link having another one of a slot and an engagement component. The linkage mechanism further includes a rotatable lever coupled to at least one housing of the valve assembly. The lever includes one of a first slot and a first engagement component operably engaged with the one of the slot and the engagement component of the at least one drive component and one of a second slot and a second engagement component operably engaged with the one of the slot and the engagement component of the link. Rotation of the at least one drive component causes the lever to rotate to convert a rotational movement of the at least one drive component to a linear movement of the link such that the link, the valve stem, and the valve member are moved axially in a direction along a longitudinal axis of the valve stem.

One advantage of the present invention is that a new linkage mechanism is provided for a valve assembly used in a vehicle. Another advantage of the present invention is that the linkage mechanism is used to pull a valve member of the valve assembly open. Yet another advantage of the present invention is that the linkage mechanism includes a lever combined with a scotch yoke to create a linear range of motion of an initial opening region of travel of the valve member. Still another advantage of the present invention is that the linkage mechanism may be capable of providing desired characteristics of good low flow resolution, high opening force, and good anti-backdrive capability over a range of valve lift while being tolerant to components and manufacturing processes. A further advantage of the present invention is that the linkage mechanism may avoid undesirable characteristics that may include a high pressure angle that may increase side loading of valve components of the valve assembly.

Other objects, features, and advantages of the present invention will be readily appreciated as the same becomes better understood after reading the subsequent description taken in connection with the accompanying drawings.

BRIEF DESCRIPTION OF THE DRAWINGS

FIGS. 9A and 9B are elevational views illustrating a closed position and open position, respectively, of a valve of the EGR valve assembly of FIG. 2.

FIG. 10 is a chart illustrating typical valve lift versus angle of rotation of an eccentrically positioned engagement component of the EGR valve assembly of FIG. 2.

FIG. 17 is a perspective view of a linkage mechanism, according to the present invention, of the EGR valve assembly of FIG. 13.

FIG. 18 is a partially exploded view of the linkage mechanism of FIG. 17.

FIG. 19 is a perspective view of a portion of the linkage mechanism of FIGS. 17 and 18.

FIGS. 22A, 22B, 22C, and 22D are a series of views of the linkage mechanism of FIGS. 17 and 18 setting the valve in a number of positions.

FIG. 23 is a partially exploded view of another embodiment of a linkage mechanism, according to the present invention, for the EGR valve assembly of FIG. 13.

DETAILED DESCRIPTION OF THE INVENTION

Figure 1:
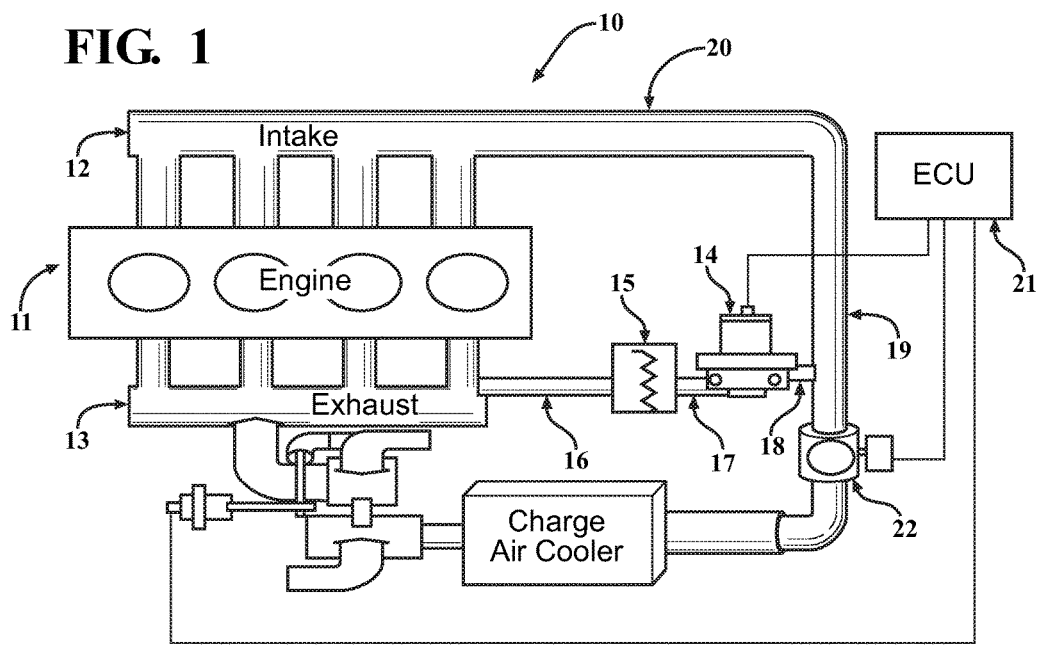
FIG. 1 is a diagrammatic view of one embodiment of an EGR system for a vehicle.

Referring now to the figures, where like numerals are used to designate like structure unless otherwise indicated, one embodiment of an EGR system 10 is shown in FIG. 1 for a vehicle (not shown). The vehicle includes an engine 11. In one embodiment, the engine 11 is a conventional internal combustion engine known in the art. The engine 11 has an intake manifold 12 and an exhaust manifold 13. The EGR system 10 is used to control combustion temperatures, and control Nox and particulate emissions from the engine 11. It should be appreciated that the engine could be of any suitable type to drive the vehicle, without departing from the scope of the present invention.

As illustrated in FIG. 1, the EGR system 10 may include an exhaust gas recirculation (EGR) valve 14 that may control the flow of exhaust gas to the intake manifold 12 and an EGR cooler 15 to reduce a temperature of the exhaust gas entering the intake manifold 12. The EGR system 10 also may include one or more conduits 16, 17, 18, 19 and 20 to provide an interconnection between the exhaust manifold 13, EGR cooler 15, EGR valve 14, and the intake manifold 12. In one embodiment, the EGR valve 14 may be of an electrically controlled type. The EGR system 10 may further include an electronic control unit (ECU) 21 to provide a signal that will control an opening/closing of the EGR valve 14. The EGR system 10 may also include a throttle valve such as air throttle 22 to control airflow into the intake manifold 13. It should be appreciated that, as the EGR valve 14 opens and closes, the EGR valve 14 may increase or decrease the flow rate of exhaust gas to the intake manifold 12. It should also be appreciated that the required EGR flow rate may be dependent upon several factors that may include the displacement of the engine 11 and a pressure differential between an exhaust and intake system.

In operation of the EGR system 10, the ECU 21 may be programmed with a map of engine operating conditions and a desired EGR flow rate for each condition. The EGR valve 14 may have a position sensor (not shown) that may be connected to the ECU 21 and provide an output signal that is relative to the valve position and flow rate through the EGR valve 14. The desired flow is translated to a position sensor output signal and an actuator control signal. The control signal may be applied to an actuator for the EGR valve 14, which may cause the EGR valve 14 to open and allow exhaust gas to flow from the exhaust manifold 13 to the intake manifold 12. The position sensor and its output signal may be part of a closed loop control system for the EGR valve 14. The position sensor will provide feedback to the ECU 21 that may indicate if the EGR valve 14 has achieved the desired position and related flow. The ECU 21 may adjust the actuator control signal to achieve-or-maintain the desired position of the EGR valve 14. The recirculated exhaust gas may mix with the incoming air and be distributed to cylinders of the engine 11 by the intake manifold 12. The mixture of exhaust gas, air, and fuel may determine the combustion temperature and control of the level of NOX and particulate matter. It should be appreciated that fuel economy may also be improved by the use of the EGR system 10. It should also be appreciated that, when the EGR valve 14 opens, the vacuum or pressure in the intake manifold 12 and the exhaust manifold 13 may be reduced and the reduction of vacuum or pressure may reduce the pumping losses of the engine 11 and the amount of fuel used by the engine 11.

In the EGR system 10 of FIG. 1, a number of electrically controlled devices such as a linear solenoid, a brush D. C. motor, a brushless D.C. motor, a torque motor, a stepper motor, a pneumatically operated device, or a hydraulically operated device, may be used in the actuator of the EGR valve 14. Valve position sensing can also be achieved by alternate methods such as counting steps of a stepper motor or by regulating fluid flow to a pneumatically or hydraulically operated EGR valve 14. It should be appreciated that a number of valve types such as throttle, poppet, or flap may be used to control the flow exhaust gas.

Figure 2:
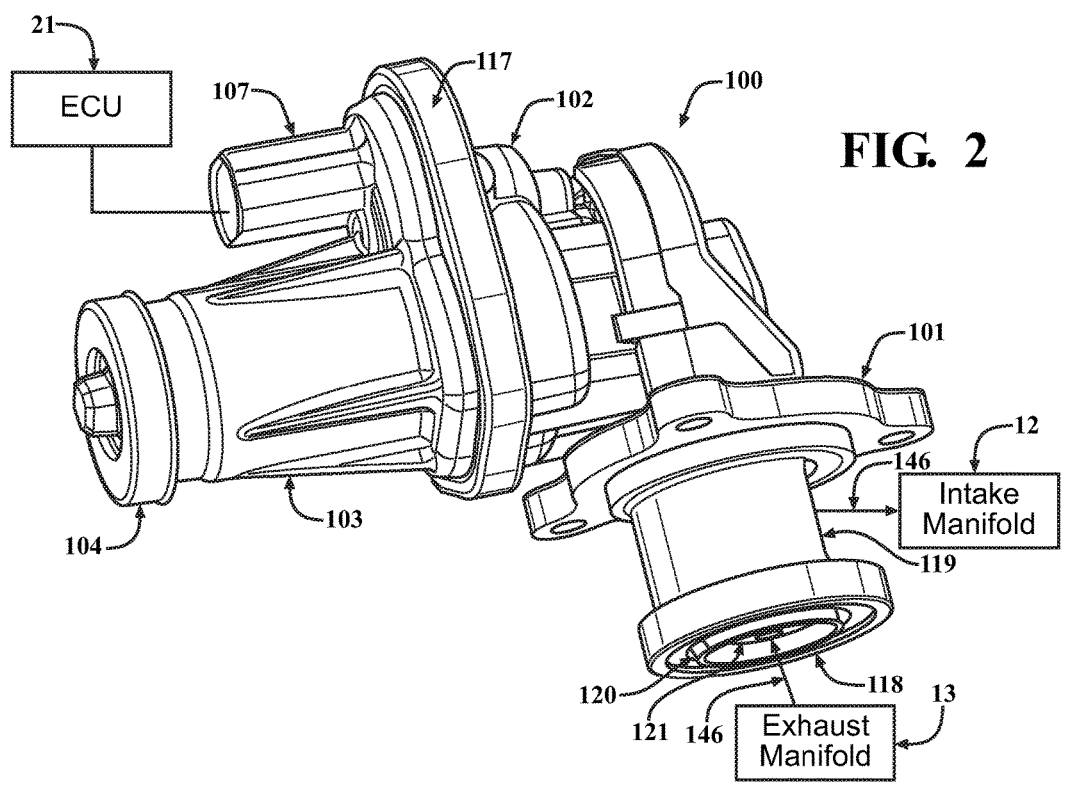
FIG. 2 is a perspective view of an EGR valve assembly of the EGR system of FIG. 1.
Figure 3:
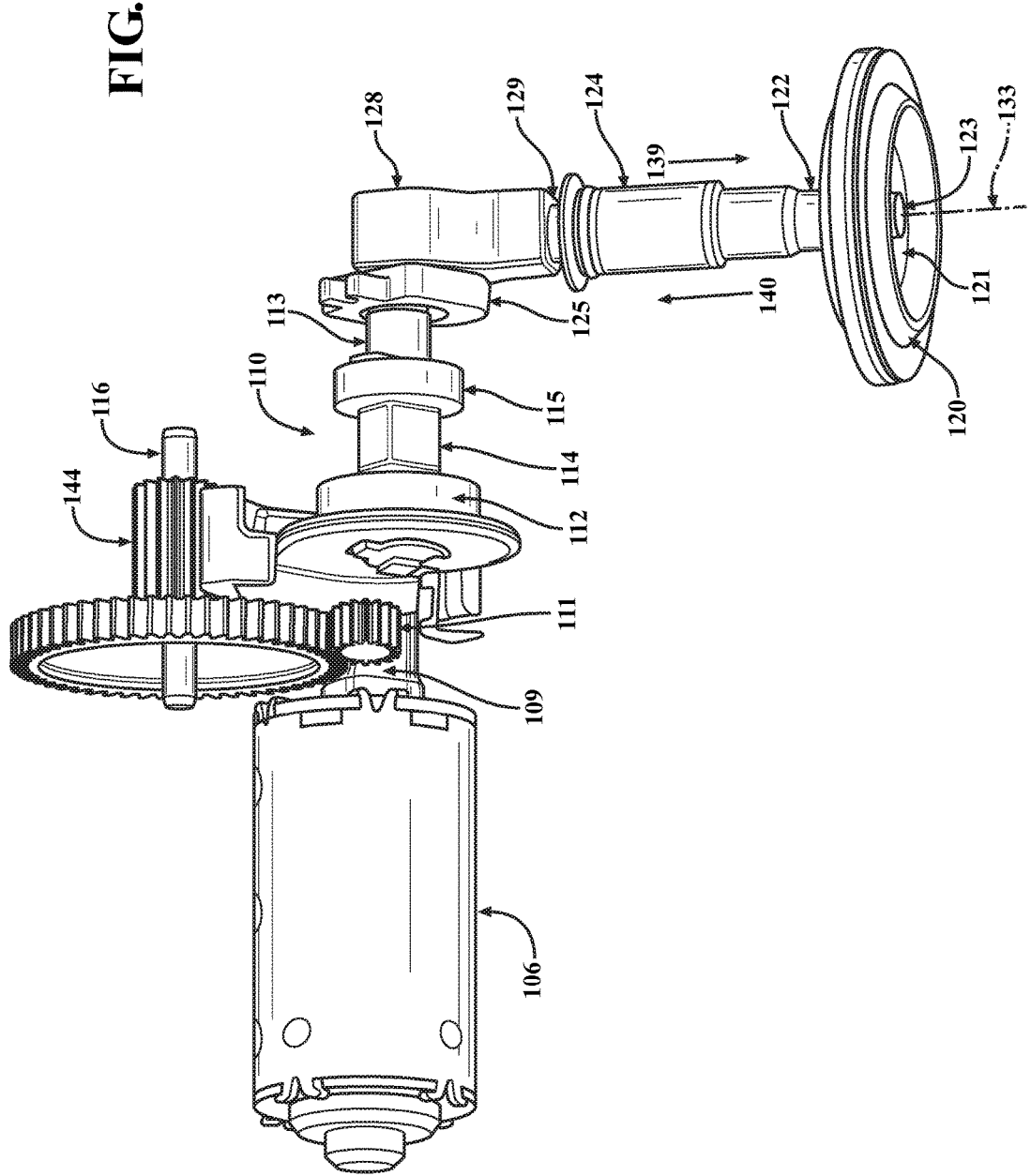
FIG. 3 is a perspective view of the EGR valve assembly of FIG. 2 with housings removed.
Figure 4:
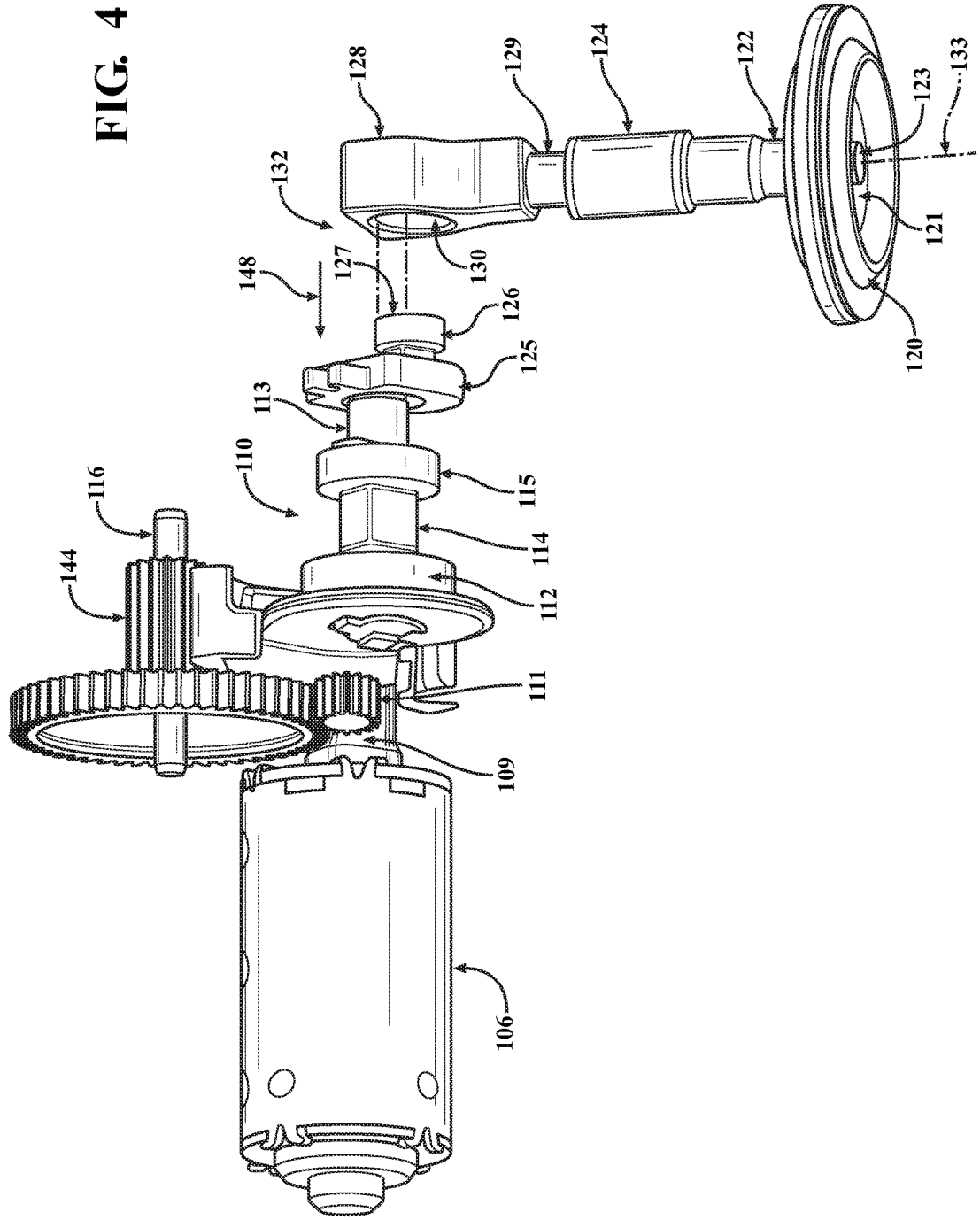
FIG. 4 is a partially exploded view of the EGR valve assembly of FIG. 3.

Referring to FIGS. 2, 3, and 4, a conventional EGR valve assembly 100 is shown for use with the EGR system 10. The EGR valve assembly 100 may include a valve housing 101, a gear housing 102, and a motor housing 103. The EGR valve assembly 100 may also include a D.C. motor 106 disposed within the motor housing 103 and retained by a cover 104. The EGR valve assembly 100 may include electrical connections to the D.C. motor 106 and other electrical components, such as a position sensor (not shown), which may be made by a lead frame (not shown). The lead frame may be operably connected to the motor housing 103 or embedded within motor housing 103. The motor housing 103 may be made using a variety of processes including injection molding. The EGR valve assembly 100 may include an electrical connector 107 integrally formed as part of the motor housing 103 to make an external connection with other vehicle components such as the ECU 21. The EGR valve assembly 100 may include a rotatable shaft 109 operably connected to and forcibly rotated by the D.C. motor 106 in response to an electrical control signal from the ECU 21.

The EGR valve assembly 100 may include a gear drive assembly 110 to translate the rotatable force of the rotatable shaft 109 and may also increase the force made available by the D.C. motor 106. The gear drive assembly 110 may include at least one drive gear 111 operably connected to the rotatable shaft 109. The gear drive assembly 110 may also include a number of driven gears including an output gear 112. The output gear 112 may be operably connected to an output shaft 113 that may be supported within the gear housing 102. The gear drive assembly 110 may include a bushing 114 and a bearing 115 to support the output shaft 113 in the gear housing 102 and may provide for efficient rotation of the output shaft 113. It should be appreciated that the number of driven gears may be limited to only the output gear 112 and, for that embodiment, the output gear 112 would engage with and be directly rotated by the drive gear 111. It should also be appreciated that it may be desirable to provide more than one driven gear.

For an embodiment having more than one driven gear, the gear drive assembly 110 may include a second driven gear 144, also referred to as an intermediate gear 144, to engage both the drive gear 111 and the gear 112, also referred to as the output gear 112. The intermediate gear 144 may be supported in the gear housing 102 by a pin 116 that may provide for rotation of the intermediate gear 144. The rotational force of the D.C. motor 106 may be translated from the drive gear 111 to the two driven gears 144, 112 and to the output shaft 113. The selection of the number driven gears may be determined by a number of factors that may include the desired rotational force and the desired rotational speed to operate the EGR valve assembly 100. It should be appreciated that the gear housing 102 may be attached to the motor housing 103 by a suitable mechanism such as threaded fasteners, rivets, or a clinch ring 117.

The valve housing 101 may include an inlet 118 for receiving a fluid flow and an outlet 119 for delivering the fluid flow. The valve housing 101 may include a valve seat 120 disposed within the valve housing 101 and secured by a suitable mechanism such as staking or casting in position.

The EGR valve assembly 100 may include a moveable valve or valve member, also referred to as a poppet valve 121, disposed in the valve housing 101 and coaxial with the valve seat 120 for controlling the fluid flow between the inlet 118 and the outlet 119. The poppet valve 121 may be fully closed and seated on the valve seat 120 and essentially block fluid flow between the inlet 118 and outlet 119. The poppet valve 121 may move axially away from valve seat 120 to a fully open position where maximum flow may occur between the inlet 118 and outlet 119. The poppet valve 121 may also move axially away from the valve seat 120 to a number of intermediate positions between the fully closed and fully open positions to control a rate of fluid flow at values that are less than a maximum fluid flow rate. The inlet 118 may be operably connected to an exhaust manifold 13 of the engine 11 and exhaust gas, indicated by the arrow 146, may flow into the inlet 118. The outlet 119 may be operably connected to an intake manifold 12 of the engine 11 and the exhaust gas 146 flowing past the valve seat 120 and the poppet valve 121 may flow through the outlet 119 and into the intake manifold 12.

The EGR valve assembly 100 may include a valve stem 122 disposed within the valve housing 101 and may be coaxial with the poppet valve 121 and the valve seat 120. The valve stem 122 may have a first end 123 that may be connected to a central location of the poppet valve 121. The poppet valve 121 may be attached to the valve stem 122 by a suitable mechanism such as welding, riveting, or staking. The valve stem 122 may be guided and supported by a bushing 124 that may be coaxial with the valve stem 122 and disposed within the valve housing 101. It should be appreciated that the bushing 124 may allow axial movement of the valve stem 122 and the poppet valve 121 along its longitudinal axis 133.

The motion of the output shaft 113 is rotary and the movement of the valve stem 122 is linear and therefore there is a need for a linkage that may convert the rotary motion of the output shaft 113 to axial movement of the valve stem 122 and the poppet valve 121. A common linkage that may provide the conversion of motion is known as a scotch yoke. The scotch yoke may include a slot formed in one moving member and an engagement component located in another moving member.

Figure 5:
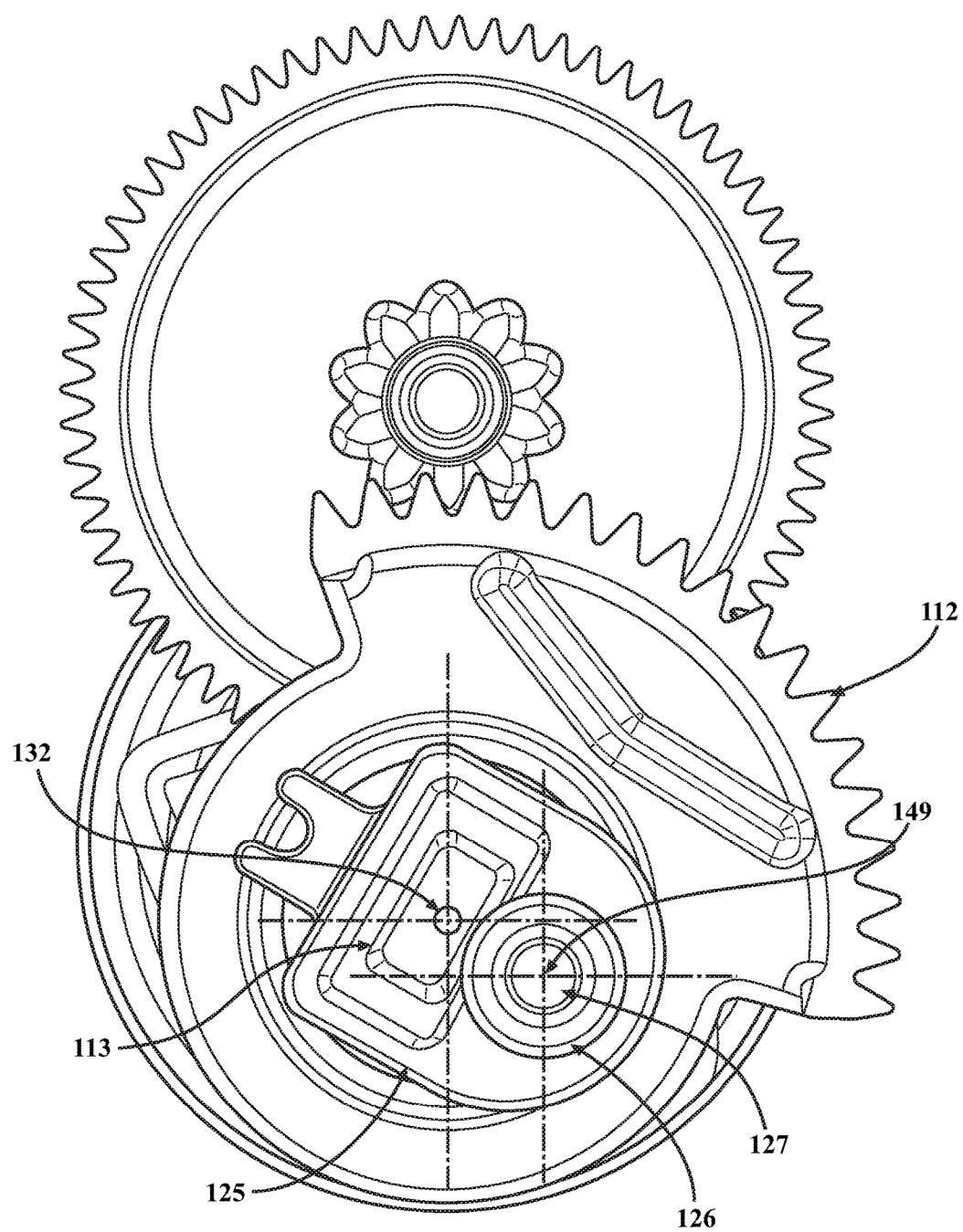
FIG. 5 is an enlarged view of a portion of the EGR valve assembly of FIG. 4.

Referring to FIGS. 3 and 4, the EGR valve assembly 100 may include a lever 125 operably connected and rotatable with the output shaft 113. The EGR valve assembly 100 may include an engagement component 126 operably connected to and moveable with the lever 125. The engagement component 126 may be a ball bearing that may be attached to the lever 125 by a pin 127. FIG. 4 is a partially exploded view with some valve components displaced to provide a view of the engagement component 126 and the pin 127. The engagement component 126 may also be a pin, a sleeve, a roller, a roller bearing, or other suitable engagement component. The engagement component 126 may be eccentrically positioned from the longitudinal axis 132 of the output shaft 113. FIG. 5 is an enlarged view shown in the direction of arrow 148 of FIG. 4 and shows the axis 149 of the engagement component 126 eccentrically located from the longitudinal axis 132 of the output shaft 113. It should be appreciated that the end of the output shaft 113 is somewhat rectangular in shape. It should also be appreciated that this portion of the output shaft 113 may engage a similar rectangular geometry in the lever 125 and provide a "keying" feature that may orient the lever 125 and the engagement component 126. It should further be appreciated that this may also prevent undesirable rotation of the lever 125 when the output gear 112 is held in a stationary position.

Referring again to FIGS. 3 and 4, the EGR valve assembly 100 may include a yoke 128 operably connected to a second end 129 of the valve stem 122 and moveable with the valve stem 122. The yoke 128 may include a horizontal slot 130 for receiving the engagement component 126. When the output shaft 113 and the lever 125 are rotated, this rotation may cause the engagement component 126 to bear on a horizontal surface of the slot 130 and forcibly move the yoke 128. This movement may be described as a simple harmonic motion (SMH) that may cause the yoke 128, valve stem 122, and poppet valve 121 to move along the longitudinal axis 133 of the valve stem 122 in a valve opening direction 140 or a valve closing direction 139 (FIG. 6).

Figure 6:
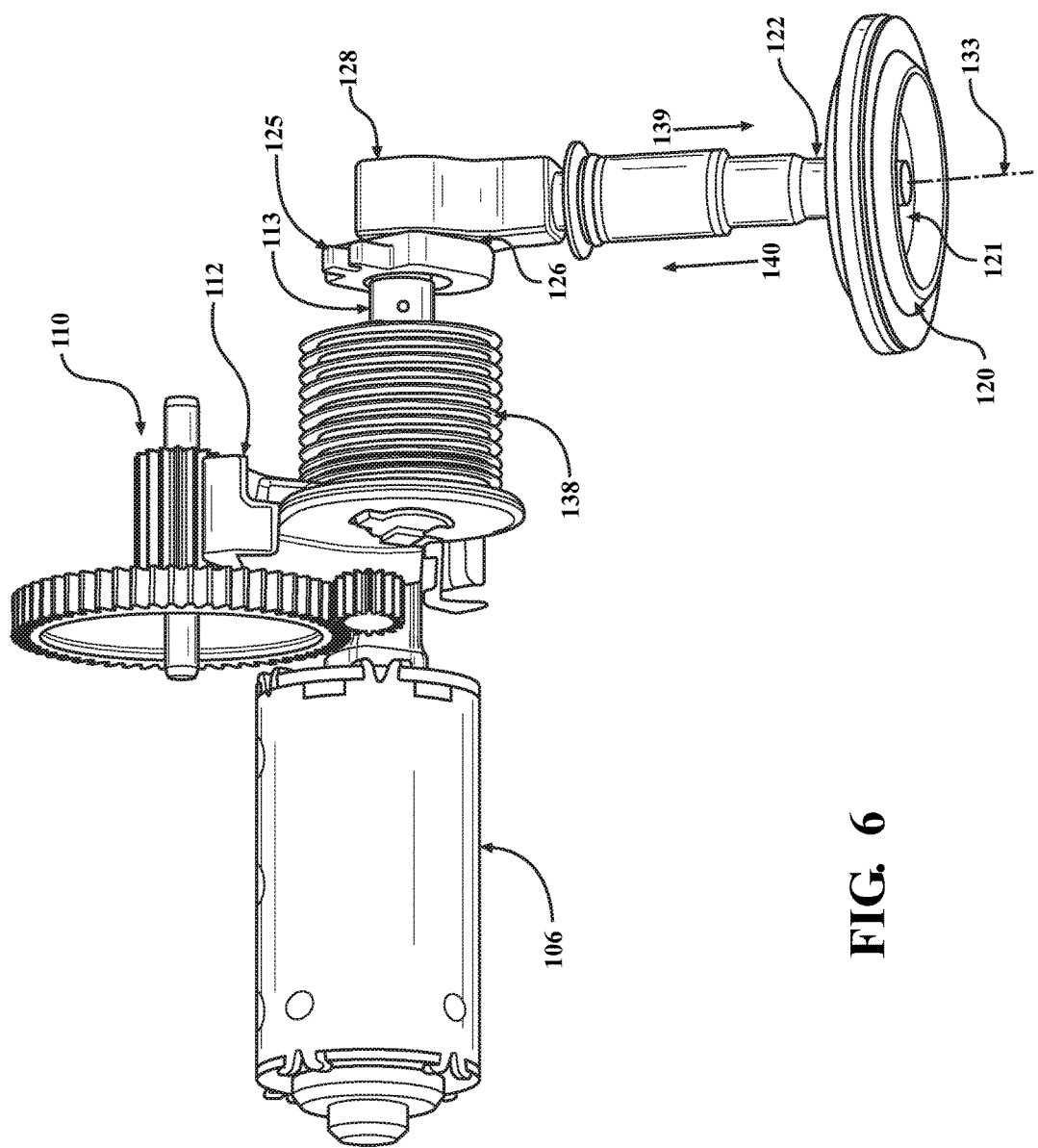
FIG. 6 is another perspective view of the EGR valve assembly of FIG. 3 illustrated with a return spring.

Referring to FIG. 6, the EGR valve assembly 100 may include a return spring 138 coaxially located with the output shaft 113 and may be operably connected to the output gear 112 and the gear housing 102. The return spring 138 may provide a bias force that will forcibly rotate the output gear 112, output shaft 113, lever 125, and engagement component 126, thereby causing the yoke 128, the valve stem 122, and the poppet valve 121 to move in the valve closing direction 139. The bias force of the return spring 138 must be overcome by the force provided by the D.C. motor 106 and the gear drive assembly 110 before the poppet valve 121 may move in the valve opening direction 140. It should be appreciated that it may be advantageous to minimize an initial bias force of the return spring 138 to avoid increasing the force capability of the D.C. motor 106 and the gear drive assembly 110. It should be appreciated that the EGR valve assembly 100, shown in FIG. 2, may function in a similar manner to the EGR valve 14 shown in FIG. 1 and previously described herein, for the EGR system 10.

The EGR valve assembly 100 shown in FIG. 2 includes the valve seat 120, poppet valve 121, and valve stem 122. However, it may also be desirable for some EGR valve assemblies and some applications to have the valve seat 120 and at least the inlet 118 located in a separate housing detached from valve housing 101. In one embodiment, the separate housing may also be a portion of another product such as an intake manifold assembly as disclosed in U.S. Pat. No. 7,204,240, the disclosure of which is expressly incorporated herein by reference. In another embodiment, the separate housing may be a portion of a component or product such as an exhaust manifold, a turbocharger, an EGR cooler, another valve, or an integrated module combining one or more components or products.

Figure 7:
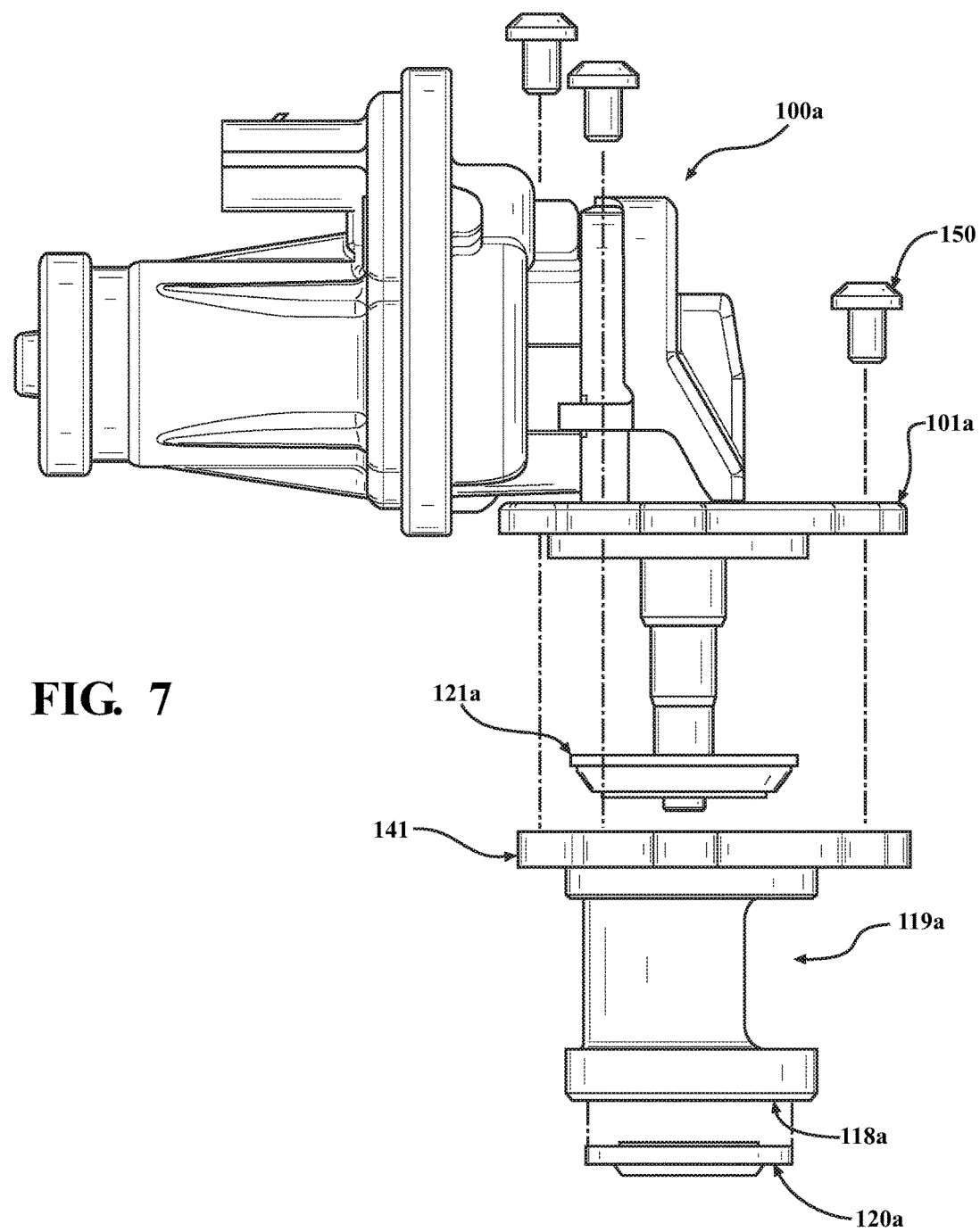
FIG. 7 is a partially exploded elevational view of the EGR valve assembly of FIG. 2.
Figure 8:
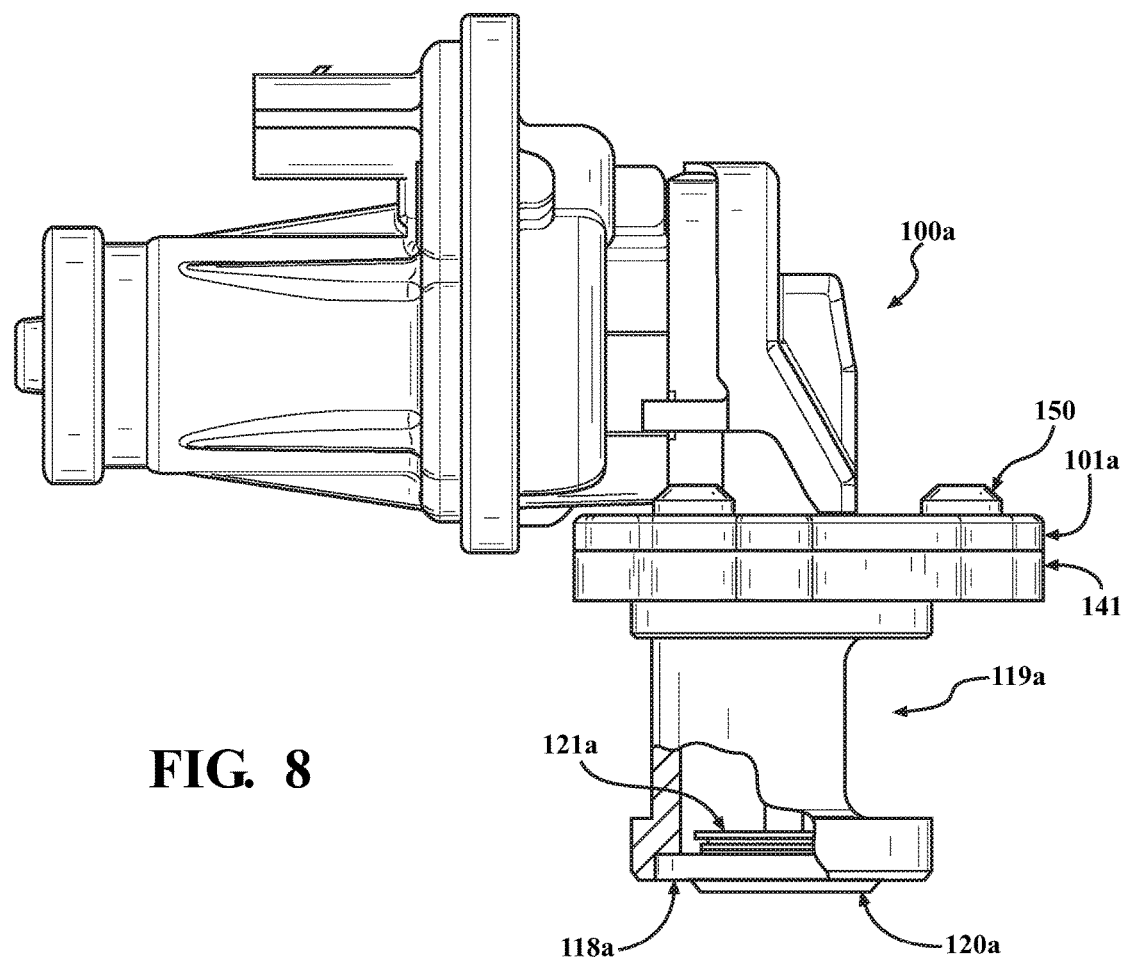
FIG. 8 is a fragmentary elevational view of the EGR valve assembly of FIG. 7.

Referring to FIG. 7, another embodiment of the EGR assembly 100 for the EGR system 10 is shown. Like parts of the EGR valve assembly 100 have like reference numerals increased by a lower case letter "a". In this embodiment, the EGR assembly 100*a* is shown with a modified housing 101*a* wherein the lower portion containing the inlet 118, the outlet 119, and the valve seat 120 has been removed. As illustrated in FIGS. 7 and 8, the EGR assembly 100*a* includes a housing 101*a* and a separate housing 141. Similar reference numerals are used to identify similar components followed by a lower case letter "a". FIG. 7 is a partially exploded view to show the assembly of some components. The separate housing 141 may include a valve seat 120*a*, an inlet 118*a* and an outlet 119*a*. The valve housing 101*a* and the separate housing 141 may be attached together by a suitable mechanism such as one or more threaded fasteners 150, rivets, or a clinch ring. FIG. 8 shows the separate housing 141 fastened to the valve housing 101*a*. A section of the separate housing 141 has been remove to show the poppet valve 121*a* seated on the valve seat 120*a*. It should be appreciated that the addition of the separate housing 141 and relocation of the valve seat 120*a* may be advantageous for assembly or packaging, however, it may also require an increase in mechanical tolerance to ensure that the poppet valve 121*a* may be seated in the correct position on the valve seat 120*a*.

Referring to FIGS. 9A and 9B, a harmonic motion of the scotch yoke may provide limits of travel for the yoke 128, valve stem 122, and poppet valve 121, 121*a* along the longitudinal axis 133 of the valve stem 122. A first and second limit of travel 135, 136 may occur when the lever 125 and engagement component 126 are rotated by the output gear 112 through a range of approximately 180 degrees and may define the maximum range of movement 142 of the poppet valve 121, 121*a* from the valve seat 120, 120*a* as illustrated in FIGS. 9A and 9B. The angle of rotation is referenced to the longitudinal axis 133 of the valve stem 122. FIG. 9A may show the first limit of travel 135 which may occur at the valve closed position, and FIG. 9B may show the second limit of travel 136 which may occur as the poppet valve 121, 121*a* is at its maximum axial lift from the valve seat 120, 120*a*.

Referring to FIG. 10, a chart illustrates a typical lift of the poppet valve 121, 121*a* versus an angle of rotation 137 (FIG. 9B) of the eccentrically positioned engagement component 126. For this embodiment and chart, the angle of rotation 137 may be lowest when the poppet valve 121, 121*a* is seated on the valve seat 120, 120*a* and the angle of rotation 137 may be highest when the poppet valve 121, 121*a* is at its maximum axial lift from the valve seat 120, 120*a*. As illustrated in FIG. 10, it should be appreciated that a negative angle of rotation beyond zero degrees may cause the yoke 128, valve stem 122, and poppet valve 121, 121*a* to reverse direction and move in the opening direction 140 and increasing the angle of rotation greater than approximately 180 degrees may cause the yoke 128, valve stem 122, and poppet valve 121, 121*a* to reverse direction and move in the closing direction 139.

The initial valve lift-to-angle slope of the poppet valve 121, 121*a* afforded by the scotch yoke may be low and therefore it may provide good flow resolution, high operating force, and good anti-backdrive capability. The anti-backdrive capability may prevent the poppet valve 121, 121*a* from opening if there is high backpressure acting on the poppet valve 121, 121*a*. This may be especially important when there is no electrical control signal applied to the EGR valve assembly 100, 100*a*. However as previously stated, as the angle of rotation moves towards zero, the first limit of travel 135 is approached and a negative angle of rotation may cause the poppet valve 121, 121*a* to unseat from the valve seat 120, 120*a*. It may therefore be practical to have an initial angle greater than zero to ensure the poppet valve 121, 121*a* may always seat on the valve seat 120, 120*a* and allow for the mechanical tolerances required for components and manufacturing processes that may cause variation in the position of the poppet valve 121, 121*a* and the valve seat 120, 120*a*.

Figure 11:
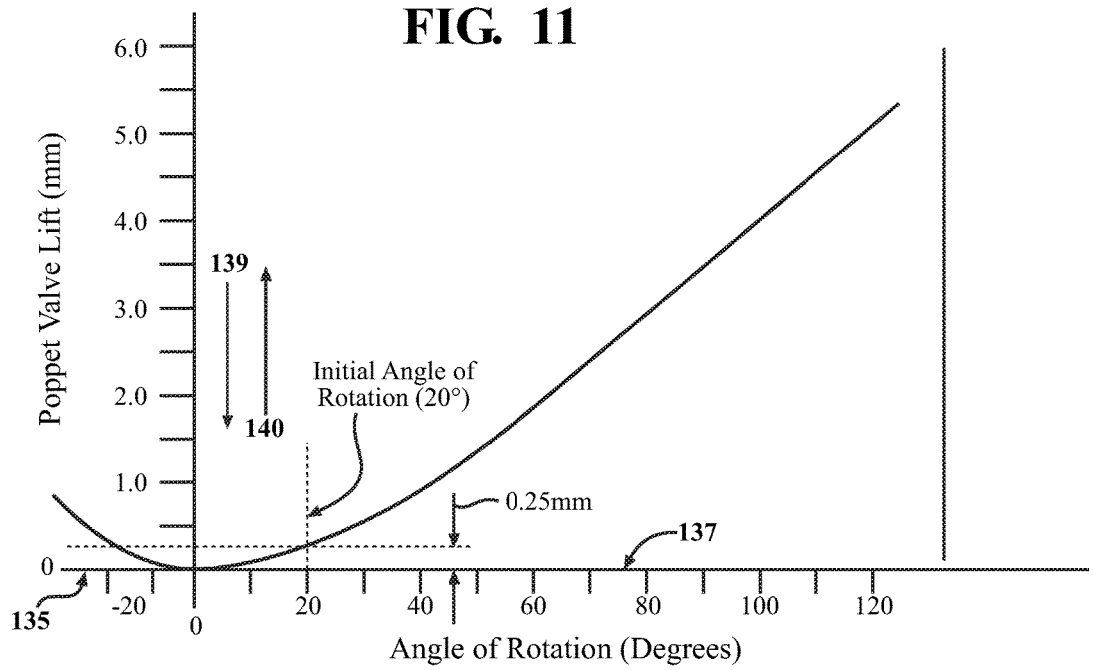
FIG. 11 is an enlarged view of a section of the chart of FIG. 10.

FIG. 11 shows an enlarged section of the chart of FIG. 10. An initial angle of approximately twenty (20) degrees may allow for a variation of approximately 0.25 mm in the position of the poppet valve 121, 121*a* and the valve seat 120, 120*a*, but the lift-to-angle slope at the initial angle of twenty (20) degrees has increased and may substantially diminish the flow resolution, operating force, and anti-back drive capability. It should be appreciated that one workable solution may be a larger motor, higher force return spring, larger package size, and higher cost, however, these solutions may not be desirable and may not improve all characteristics. It should also be appreciated that, if the lower lift-to-angle slope could somehow be maintained as the eccentric engagement component 126 rotates over a greater angular range, this would afford the desired characteristics (good low flow resolution, high opening force, and good anti-backdrive capability) and accommodate the positional variation of the poppet valve 121, 120*a* and the valve seat 120, 120*a*.

Figure 12:
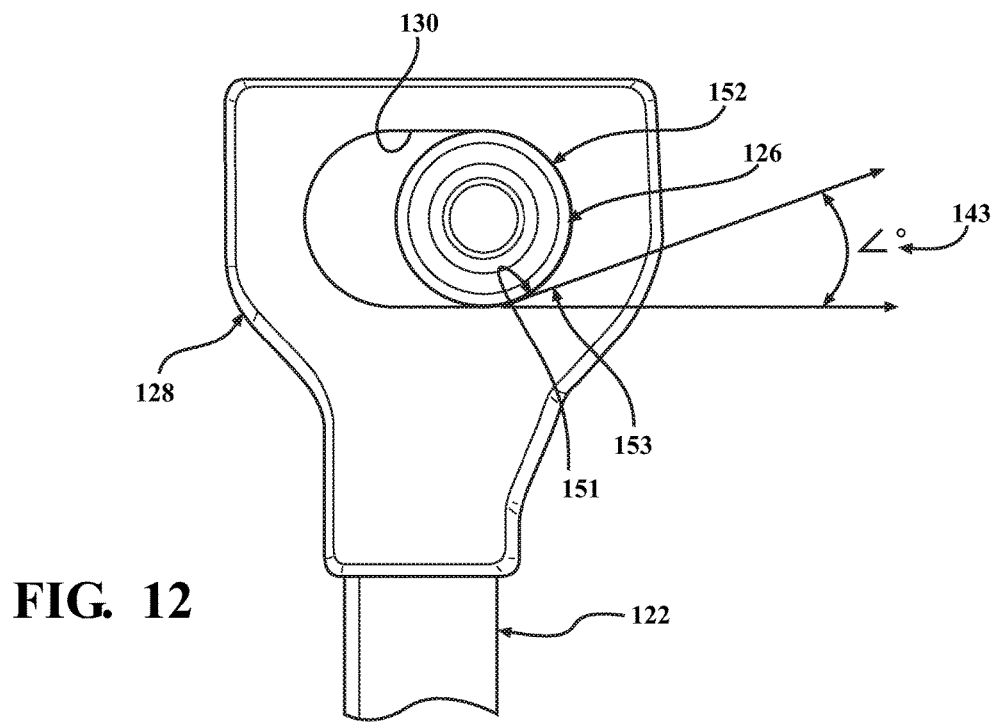
FIG. 12 is an elevational view of a scotch yoke of the EGR valve assembly of FIG. 2.

Another workable solution, illustrated in FIG. 12, may be to modify a profile of the yoke slot 130 from a horizontal slot to an appropriate cam profile 152 which will meet the desired motion profile. Unfortunately, this modification can introduce a pressure angle 143 to the yoke 128 at a point 151 at which the engagement component 126 may contact the cam profile 152. The pressure angle 143 may be up to approximately twenty-six (26) degrees and may result in a force in the direction of arrow 153 which may be perpendicular to the pressure angle 143. It should be appreciated that this may cause a side load which may increase friction and wear of the valve stem 122 and bushing 124 and may prevent uniform seating of the poppet valve 121, 121*a* on the valve seat 120, 120*a*.

Figure 13:
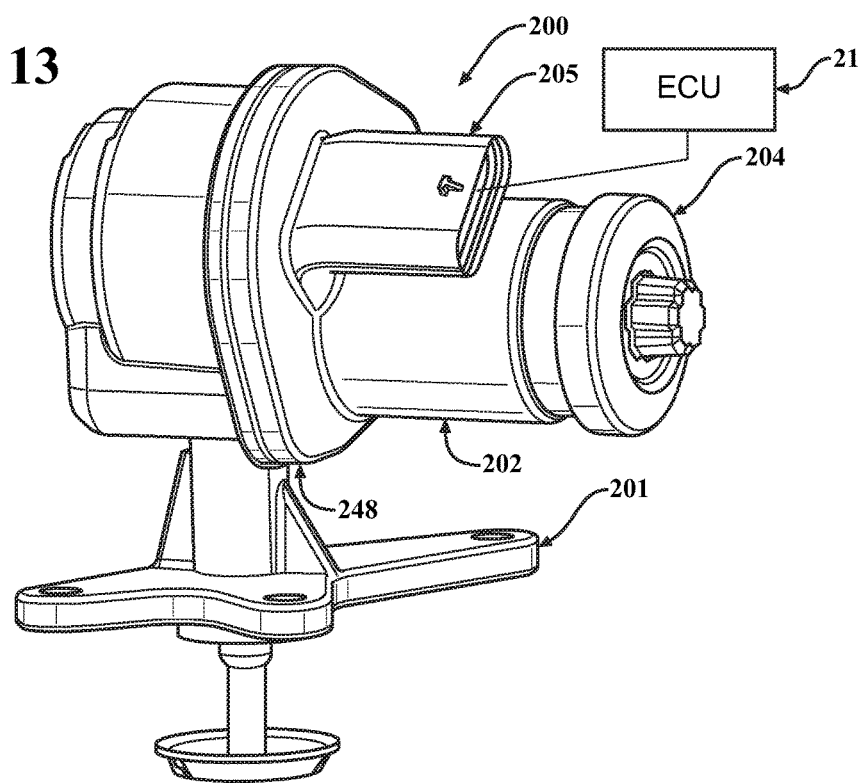
FIG. 13 is a perspective view of one embodiment of an EGR valve assembly, according to the present invention, used with the EGR system of FIG. 1.
Figure 14:
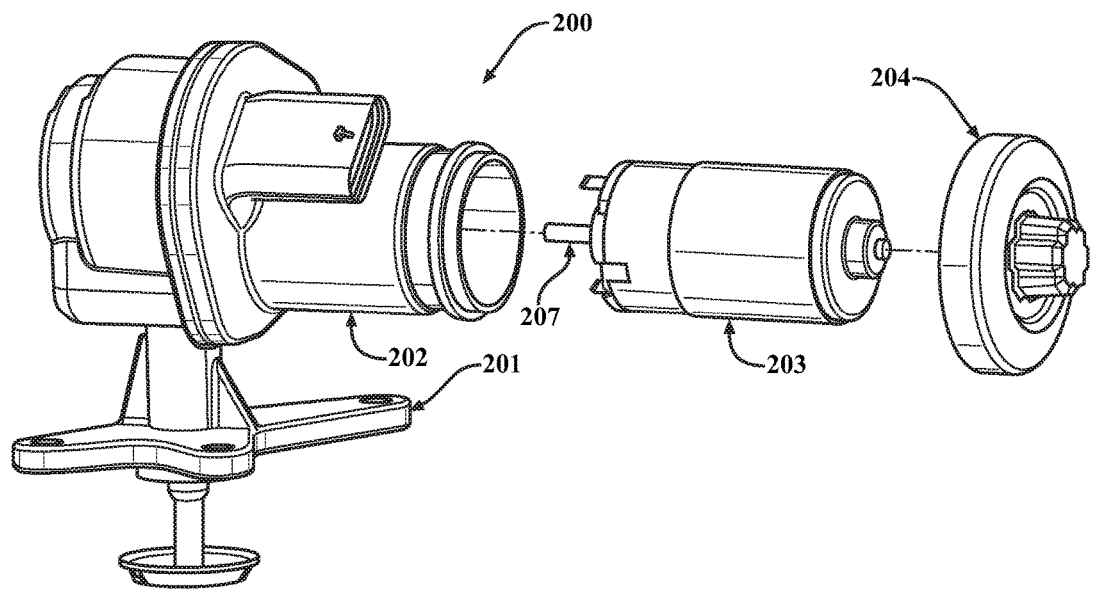
FIG. 14 is a partially exploded view of the EGR valve assembly of FIG. 13.

Referring to FIGS. 13 and 14, one embodiment of an EGR valve assembly 200, according to the present invention, is shown for use with the EGR system 10 in FIG. 1. As illustrated in FIG. 13, the EGR valve assembly 200 may include a first housing 201 and a motor housing 202. The first housing 201 may be attached to the motor housing 202 by a suitable mechanism such as threaded fasteners, rivets, or a clinch ring 248. As illustrated in FIG. 14, the EGR valve assembly 200 may include a D.C. motor 203 that may be disposed within the motor housing 202 and retained by a cover 204. The D.C. motor 203 may provide a rotational force that will actuate a valve of the EGR valve assembly 200. It should be appreciated that, as previously stated, other types actuators may be used for actuation and they may include, brush D.C. motors, brushless D.C. motors, stepper motors, torque motors, pneumatic actuators, and hydraulic actuators.

Electrical connections to the D.C. motor 203 and other electrical components, such as a position sensor (not shown), may be made by a lead frame (not shown). The lead frame may be operably connected to the motor housing 202 or may be embedded within the motor housing 202. The motor housing 202 may be made using a variety of processes including injection molding. An electrical connector 205, may be integrally formed as part of the motor housing 202 to make an external connection with other vehicle components such as the ECU 21. A rotatable shaft 207 may be operably connected to and forcibly rotated by the D.C. motor 203 in response to an electrical control signal from the ECU 21.

Figure 15:
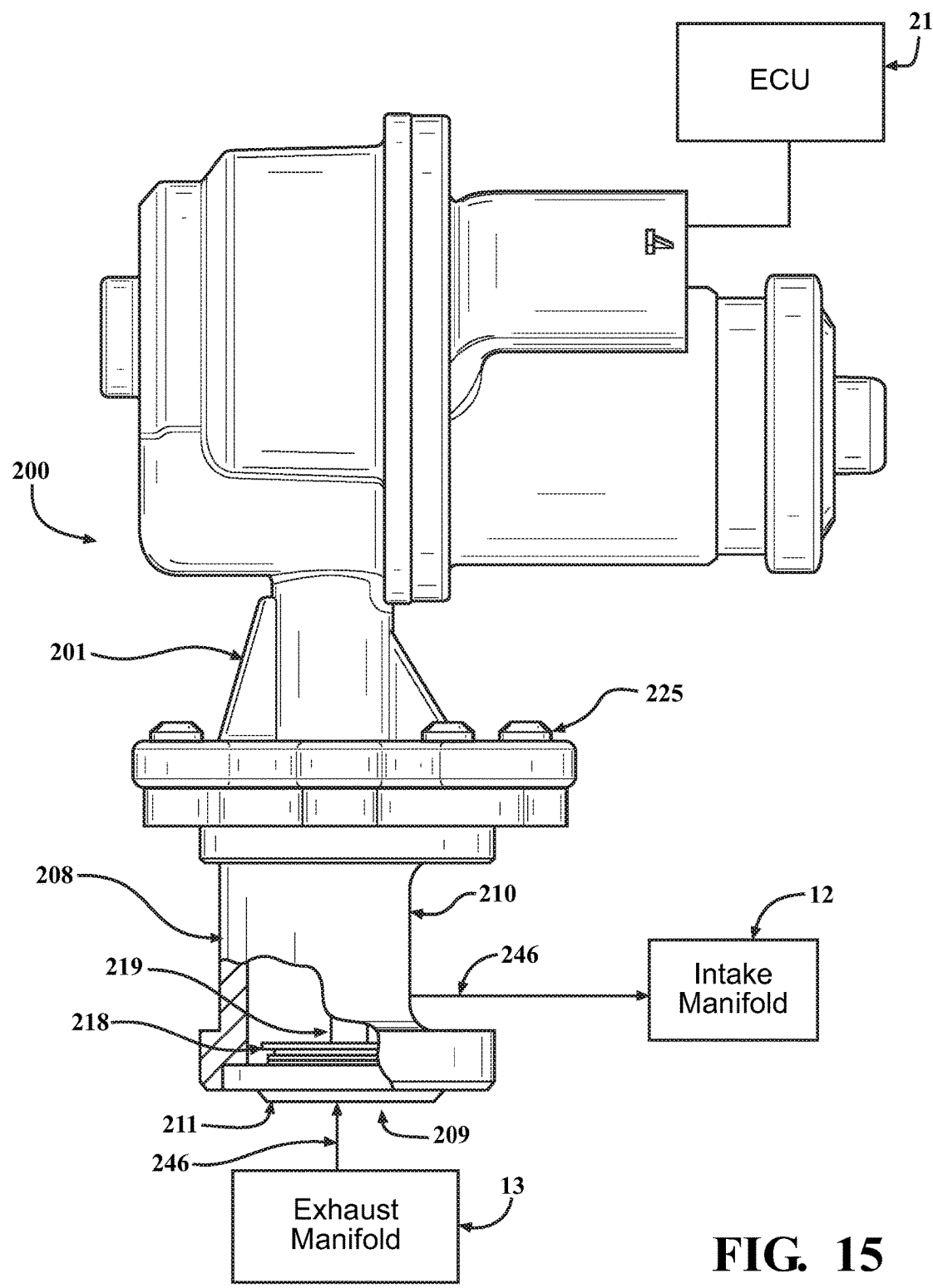
FIG. 15 is a fragmentary elevational view of the EGR valve assembly of FIG. 13.
Figure 16:
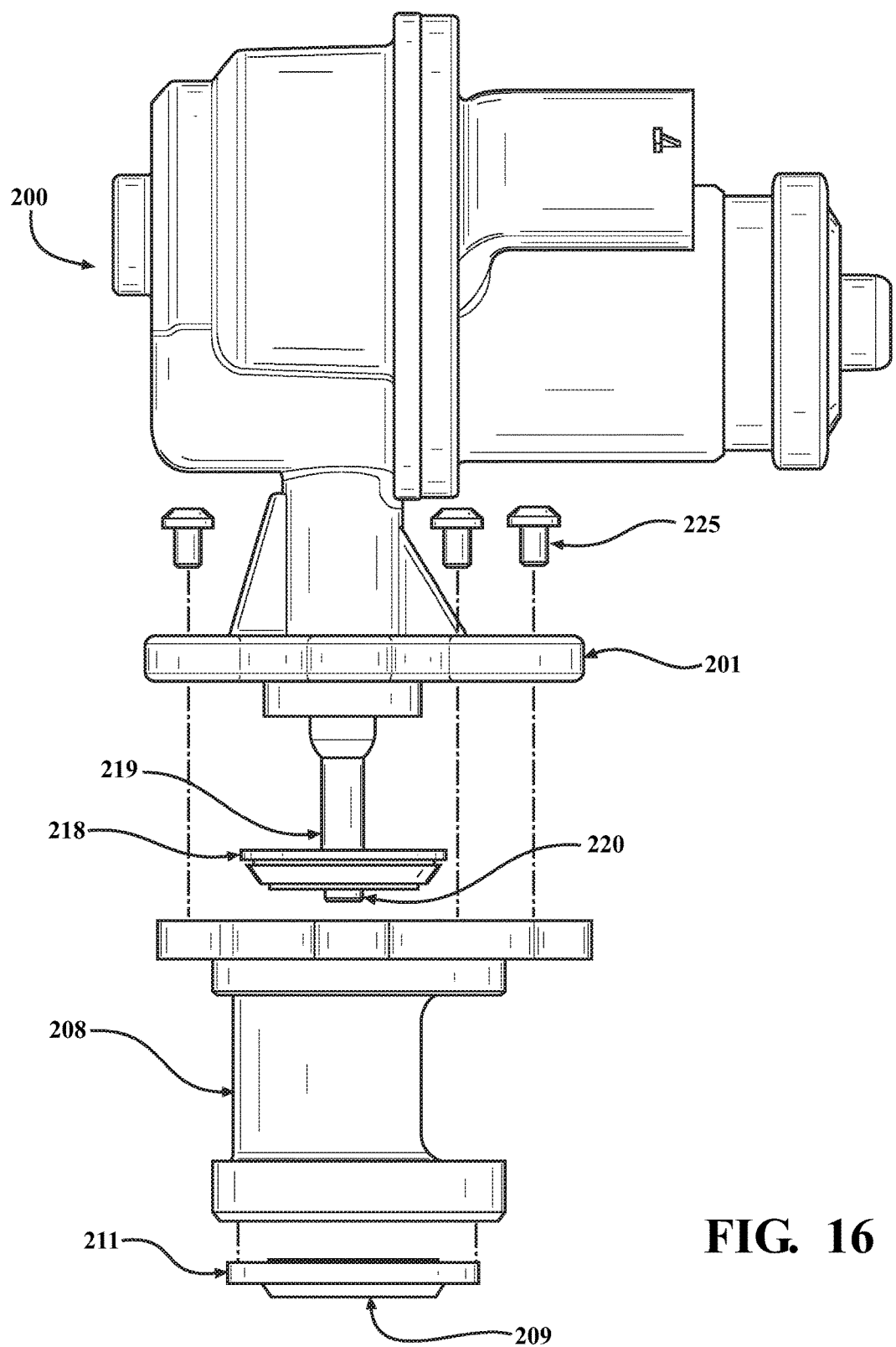
FIG. 16 is a partially exploded elevational view of the EGR valve assembly of FIG. 13.

Referring to FIGS. 15 and 16, the EGR valve assembly 200 may be similar to the EGR valve assembly 100*a* in that it may have a separate housing 208 which may have an inlet 209 for receiving a fluid flow and an outlet 210 for delivering fluid flow. A valve seat 211 may be disposed within the separate housing 208 and secured by staking, casting in position, or other suitable mechanism. The separate housing 208 may also be a portion of another component or product as previously stated herein. The first housing 201 and the separate housing 208 may be attached by one or more threaded fasteners 225, rivets, a clinch ring, or other suitable methods. The inlet 209 may be operably connected to the exhaust manifold 13 of the engine 11 and the exhaust gas, indicated by the arrow 246, may flow into the inlet 209. The outlet 210 may be operably connected to the intake manifold 12 of the engine 11 and the exhaust gas 246 flowing past the valve seat 211 may flow through the outlet 210 and into the intake manifold 12.

The EGR valve assembly 200 also includes a moveable valve or valve member, also referred to as a poppet valve 218, which may be coaxial with the valve seat 211 for controlling the fluid flow between the inlet 209 and the outlet 210. The poppet valve 218 may be in a fully closed position and seated on the valve seat 211 and essentially block fluid flow between the inlet 209 and the outlet 210. The poppet valve 218 may move axially away from the valve seat 211 to a fully open position where maximum fluid flow may occur between the inlet 209 and the outlet 210. It should be appreciated that the poppet valve 218 may also move axially away from the valve seat 211 to a number of intermediate positions between the fully closed and fully open positions to control the rate of fluid flow at values that are less than the maximum fluid flow rate.

The EGR assembly 200 further includes a valve stem 219 that may be at least partially located in both of the first housing 201 and the separate housing 208 and may be coaxial with the poppet valve 218 and the valve seat 211. The valve stem 219 has a first end 220 that may be connected to a central location of the poppet valve 218. The poppet valve 218 may be attached to the valve stem 219 by welding, riveting, staking, or other suitable mechanisms. The valve stem 219 may be guided and supported by a bushing 243 as illustrated in FIG. 17. The bushing 243 may be coaxial with the valve stem 219 and may be disposed within the first housing 201. It should be appreciated that the bushing 243 may allow axial movement of the valve stem 219 and the poppet valve 218 along its longitudinal axis 221.

Referring to FIGS. 17, 18A 18B, and 19, the EGR valve assembly 200 also includes a gear drive assembly 212 that may be used to translate the rotational force delivered by the rotatable shaft 207 and may also increase the rotational force made available by the D.C. motor 203. The gear drive assembly 212, which may include the rotatable shaft 207, may also include at least one drive gear 213 operably coupled or connected to the rotatable shaft 207. The gear drive assembly 212 may also include a number of driven gears including an output gear 214. The output gear 214 may be operably coupled or connected to a second shaft, also referred to as an output shaft 215, which may be supported within the first housing 201 for providing efficient rotation of either or both the output gear 214 and the output shaft 215. It should be appreciated that the number of driven gears may be limited to only the output gear 214 and, for that embodiment, the output gear 214 engages with and is directly rotated by the drive gear 213.

As illustrated in FIGS. 17-19, the gear drive assembly 212 may include a first driven gear 216 and a second driven gear 217 that may engage the drive gear 213 and a third driven gear, such as the output gear 214. The first and second driven gears 216, 217 may also be referred to as intermediate gears 216, 217. The intermediate gears 216, 217 may be supported in the first housing 201 by gear pins 228 and 229 that may provide for rotation of the intermediate gears 216, 217. In one embodiment, the drive and driven gears 213, 214, 216, 217 are of a variety known as spur gears and each gear may have at least one section of gear teeth spread along their circumference. In one embodiment, the two intermediate gears 216, 217 may be compound gears, each having two gear teeth sections spaced apart on circumferential sections. The first intermediate gear 216 may be in operable engagement with the drive gear 213 and the second intermediate gear 217 and the second intermediate gear 217 may be in operable engagement with the first intermediate gear 216 and the output gear 214.

The rotational force of the D.C. motor 203 may be translated from the drive gear 213 to the three driven gears 216, 217, and 214. The output gear 214 may translate the rotational force to the output shaft 215 if the output shaft 215 is operably connected to and rotatable with the output gear 214. It should be appreciated that the selection of the number driven gears may be determined by a number of factors that may include the desired rotational force and the desired rotational speed to operate the EGR valve assembly 200.

The EGR assembly 200 may also provide a rotary motion or rotational movement from the output gear 214 that must be translated to provide a linear movement of the valve stem 219. However a linkage mechanism may be required that may have a greater tolerance to the positional variation of the poppet valve 218, the valve stem 219, and the valve seat 211 that may be increased with use of the separate housing 208. It should be appreciated that the linkage mechanism must also provide the desirable characteristics of good low flow resolution, high opening force, and good anti-backdrive capability while avoiding side loading of the valve stem 219 that may cause excessive wear.

Figures 18A, 18B:
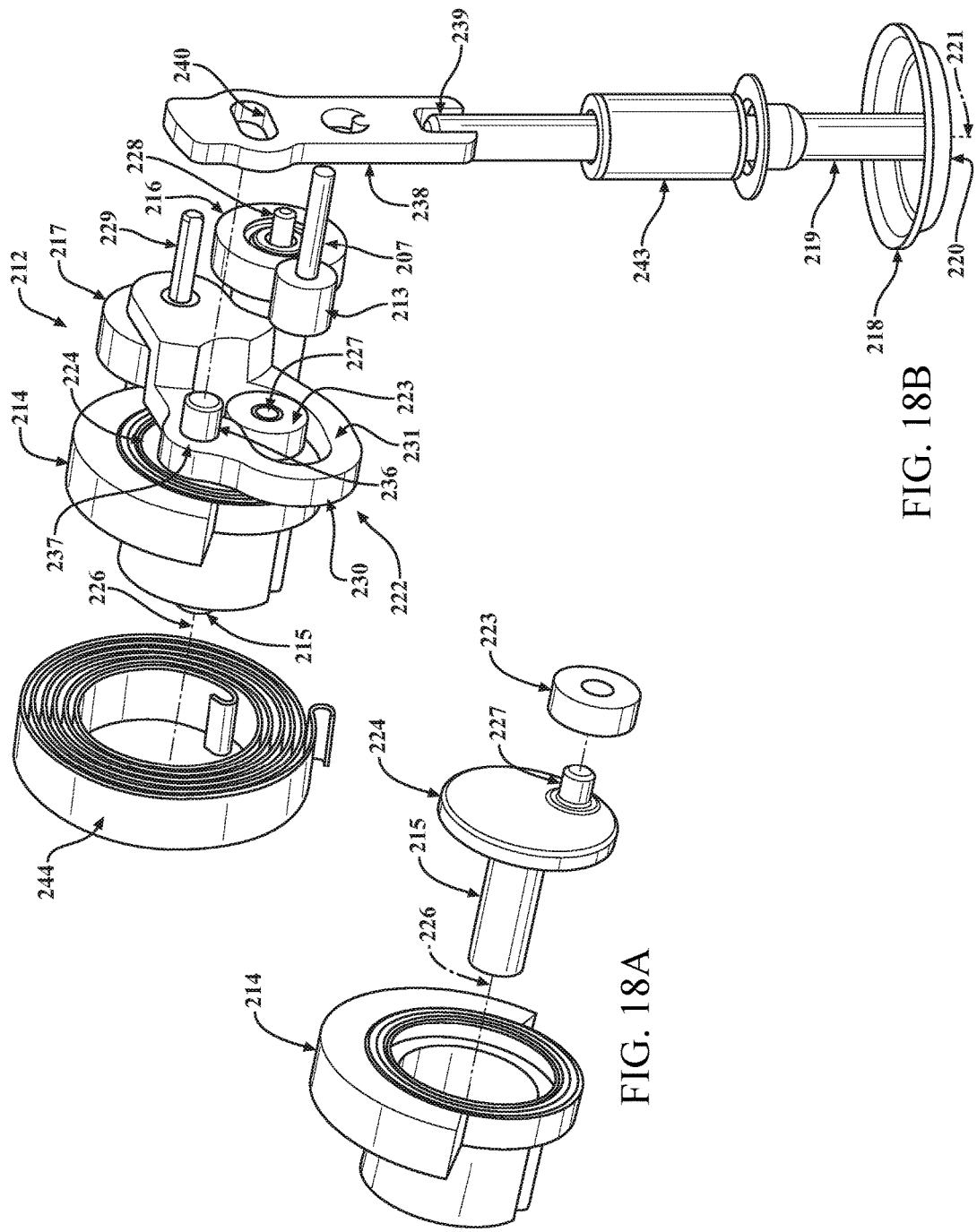
FIGS. 18A and 18B are partially exploded views of the linkage mechanism of FIG. 17.

Referring again to FIGS. 17, 18A, 18B, 19, and 20, the EGR assembly 200 may include a linkage assembly or mechanism 222, according to one embodiment of the present invention, for actuation of a valve such as the poppet valve 218. The linkage mechanism 222 may include an engagement component 223 that may be operably coupled or connected to the output gear 214 by a hub portion 224. The hub portion 224 may be formed as a portion of the output shaft 215, as illustrated in FIGS. 18A and 18B, may be a separate component operably connected to the output shaft 215, or may be directly connected to the output gear 214. The engagement component 223 may be at least one of a pin, a sleeve, a roller, a ball bearing, a roller bearing, or other suitable engagement component. In one embodiment, the engagement component 223 is a ball bearing which is eccentrically positioned from the longitudinal axis 226 of the output shaft 215 and the output gear 214. The engagement component 223 may be supported on the hub portion 224 by a pin 227. The engagement component 223 may be operably coupled or connected to the output gear 214 by a number of methods that may be within the scope of the present invention. These methods may include, but are not limited to, forming the engagement component 223 as a portion of the output gear 214, attaching the engagement component 223 directly to the output gear 214, attaching the engagement component 223 to another component that is operably connected to the output gear 214. It should be appreciated that the other component may be a lever, a separate hub, or other suitable component that may be moveable with the output gear 214.

Figure 20:
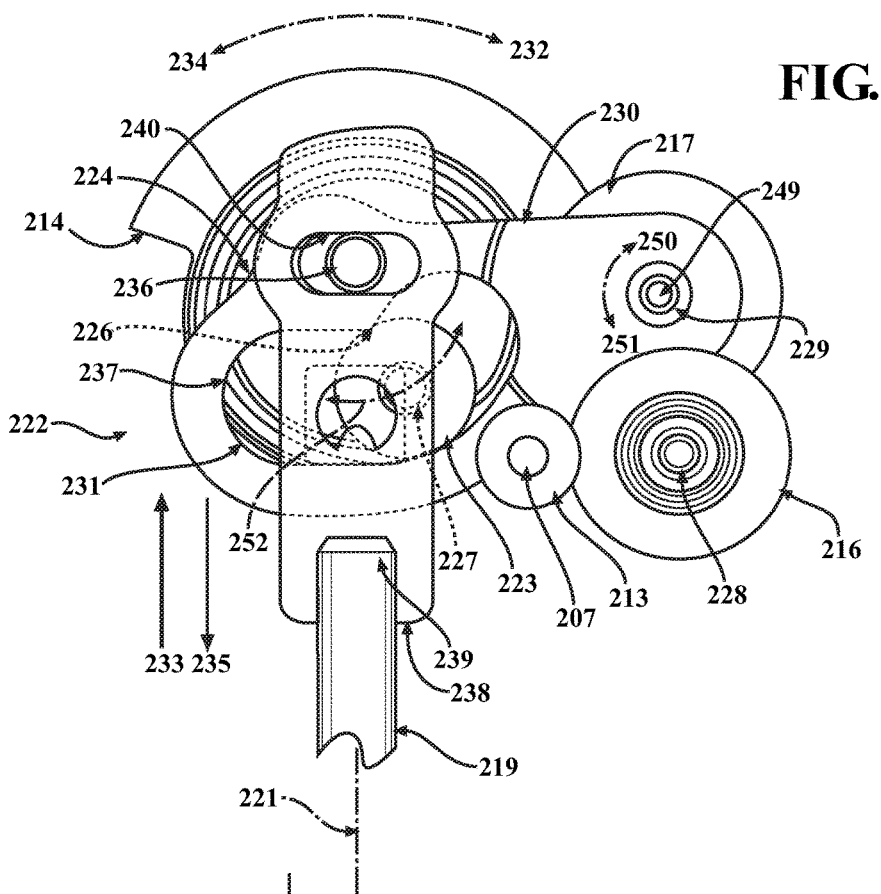
FIG. 20 is an elevational view of the linkage mechanism of FIGS. 17 and 18.

The linkage mechanism 222 may further include a lever 230 which is coupled to the first housing 201 by a gear pin 229 which may also couple the intermediate gear 217 to the first housing 201. The gear pin 229 may allow for rotation of the lever 230 about an axis 249 of the gear pin 229. The lever 230 may include a slot 231 for receiving the engagement component 223. It should be appreciated that FIGS. 18A and 18B show a partially exploded view in which some components have been displaced to provide a better view of components of the linkage mechanism 222. It should also be appreciated that FIG. 20 shows the linkage mechanism 222 with a link 238 made transparent to provide a better view of the engagement component 223 in the slot 231 of the lever 230.

When the output gear 214 is forcibly rotated in a first direction 232, the engagement component 223 may rotate about the axis 226 of the output gear 214 and the output shaft 215. The rotary movement of the engagement component 223 is depicted by an arced line 252 which has arrows that may show the direction of movement. The forced rotation of the output gear 214 in the first direction 232 may cause the engagement component 223 to make contact with a surface of the slot 231 and may force the lever 230 to rotate in a first direction 250 about the axis 249 of the gear pin 229 and may force the lever 230 to move in a first direction 233 which may be parallel to the longitudinal axis 221 of the valve stem 219. When the output gear 214 is forcibly rotated in a second direction 234, the engagement component 223 may contact a surface of slot 231 and may force the lever 230 to rotate in a second direction 251 about the axis 249 of the gear pin 229 and may force the lever 230 to move in a second opposite direction 235 which is parallel to the longitudinal axis 221 of the valve stem 219.

In one embodiment, the lever 230 may also include a second engagement component 236 that may be at least one of a pin, a sleeve, a roller, a ball bearing, a roller bearing or other suitable engagement component. The second engagement component 236 may be operably coupled or connected to the lever 230 and extend from a surface 237 of the lever 230.

The linkage mechanism 222 may further include a link 238 which may be operably coupled or connected to a second end 239 of the valve stem 219 and may be moveable with the valve stem 219. The link 238 may be a separate component or it may be formed as a portion of the second end 239 of the valve stem 219. The link 238 may include a transverse or horizontal slot 240 for receiving the second engagement component 236 of the lever 230. It should be appreciated that the linkage mechanism 222 may be used with other types of valves such as an air throttle valve, exhaust throttle valve, bypass valve, turbo waste gate valve, or recirculation valve without departing from the scope of the present invention.

In operation of the linkage mechanism 222, when the output gear 214 is forcibly rotated in the first direction 232 forcing the lever 230 to move in the first direction 233, the second engagement component 236 may contact a surface of the horizontal slot 240 of the link 238 and may force movement of the link 238, the valve stem 219, and the poppet valve 218 in the first direction 233, which may unseat the poppet valve 218 from the valve seat 211 and allow fluid flow between the inlet 209 and the outlet 210. When the output gear 214 is forcibly rotated in the second direction 234, forcing the lever 230 to move in the second direction 235, the second engagement component 236 may contact a surface of the horizontal slot 240 of the link 238 and may force movement of the link 238, the valve stem 219, and the poppet valve 218 in the second direction 235, which may seat the poppet valve 218 on the valve seat 211 and block fluid flow between the inlet 209 and the outlet 210.

Figure 21:
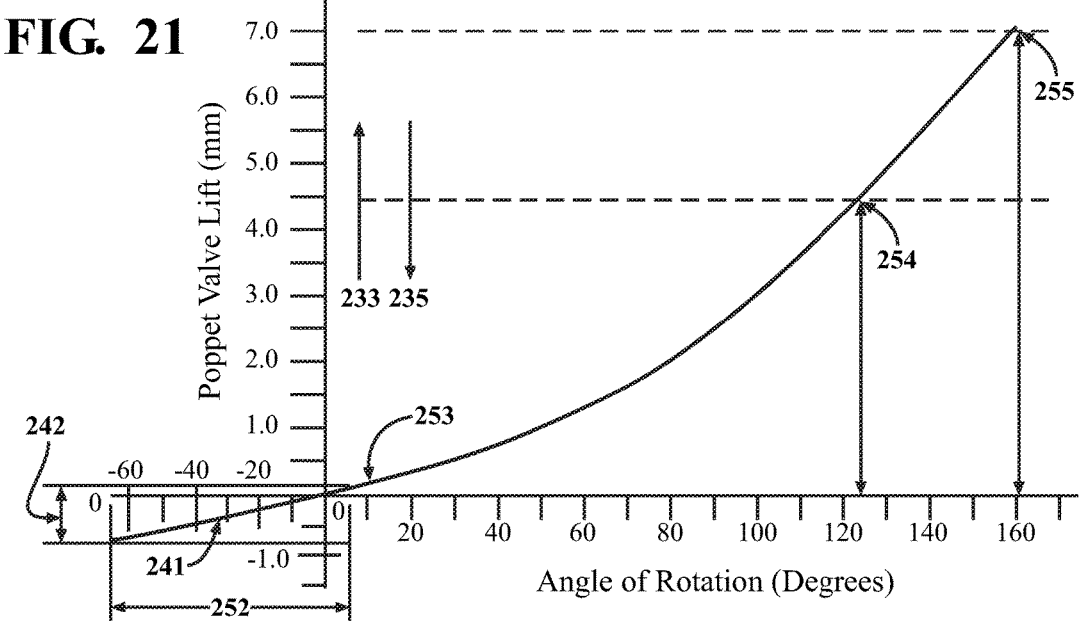
FIG. 21 is a chart illustrating a valve lift-to-rotation relationship that may be achieved with the linkage mechanism of FIGS. 17 and 18.

Referring to FIGS. 18A, 18B, and 20, the slot 231 of the lever 230 has a predetermined shape. In one embodiment, the predetermined shape of the slot 231 has an arcuate portion and a transverse or horizontal portion. The movement of the link 238, valve stem 219 and poppet valve 218 may be determined by the movement of the engagement component 223 in the slot 231 of the lever 230. The predetermined shape of the slot 231 may be contoured to provide a specific lift-to-rotation slope (lift of the poppet valve 218 versus rotation of the engagement component 223 and the output gear 214). The chart of FIG. 21 shows a lift-to-rotation relationship that may be achieved with the linkage mechanism 222. The initial slope 241 shows a constant rate of opening of the poppet valve 218 which may occur over a range 252 between minus sixty (−60) degrees and plus five (+5) degrees of rotation of the engagement component 223 and the output gear 214. The approximate sixty-five (65) degrees of rotation may provide a range of the poppet valve lift 242 for accommodating variation of the seating position of the poppet valve 218 on the valve seat 211 which may be caused by the tolerances of components and assembly processes. In one embodiment, the range 252 of sixty-five (65) degrees for the initial slope 241 may occur over a poppet valve lift 242 of 0.80 mm, as illustrated by the chart of FIG. 21. It should be appreciated that, however, it is possible to configure the linkage mechanism 222, to achieve a range that is greater or less than sixty-five (65) degrees for the initial slope, and a poppet valve lift 242 that is greater or less than 0.80 mm.

In the embodiment illustrated in FIG. 20, the lever 230 and the valve stem 219 form a right angle relative to each other when either the second slot 240 or the second engagement component 236 is located on the longitudinal axis 221 of the valve stem 219 when the poppet valve 218 is in a closed position. More specifically, the intersection of the longitudinal axis 221 of the valve stem 219 and an axis transverse through the lever 230 to the axis 249 of the gear pin 229 forms a right angle when the poppet valve 218 is seated on the valve seat 211.

FIGS. 22A-22D show a series of views of the linkage mechanism 222 setting the poppet valve 218 in a number of positions. Referring also to the chart of FIG. 21, FIG. 22A shows the linkage mechanism 222 positioning the poppet valve 218 in a closed position that may be near the end of the range 252, for example at minus sixty (−60) degrees. FIG. 22B shows the linkage mechanism 222 positioning the poppet valve 218 in a closed position that may be at a nominal position in the range 252, for example at zero (0) degrees. FIG. 22C shows the linkage mechanism 222 positioning the poppet valve 218 at a start-to-open position 253 that may occur at an angle of rotation of approximately ten (10) degrees. FIG. 22D shows the linkage mechanism 222 positioning the poppet valve 218 near the full open position 254 that may occur at an angle of rotation of one hundred twenty-five (125) degrees.

It should be appreciated that the total angle of rotation for the linkage mechanism 222 is one hundred ninety (190) degrees (−65°+125°=190°) which exceeds the maximum one-hundred eighty (180) degrees of rotation for the scotch yoke of the EGR valve assembly 100. The angle of rotation for the linkage mechanism 222 may be further increased by extending the slot 231 in the lever 230. For example, the slot 231 may be extended to allow an angle of rotation of plus one hundred sixty (+160) degrees and total angle of rotation of two hundred twenty-five (225) degrees (−65°+160°=225°) as illustrated by the chart of FIG. 21. It should be appreciated that the higher angle of rotation may afford a higher poppet valve lift 255 which may be a desirable feature for increasing the flow capability of the EGR valve assembly 200.

With reference to FIGS. 22A, 22B, 22C, and 22D, the pressure angle 256, which may occur at the point of contact 258 between the second engagement component 236 and the horizontal slot 240, is essentially zero and remains essentially zero as the link 238, the valve stem 219, and the poppet valve 218 are moved between the valve closed and full open positions. The low pressure angle 256 may result in a force applied in the direction of arrow 257 which is essentially perpendicular to the pressure angle 256 and the horizontal slot 240. It should be appreciated that the low pressure angle 256 may minimize or eliminate side loading on the valve stem 219 and minimize wear between the sliding surfaces of the valve stem 219 and the bushing 243.

Other desirable characteristics afforded by the linkage mechanism 222 may be the high opening force made possible by the high mechanical advantage and high opening force that may be achieved by the low poppet valve lift-to-angle of rotation over the initial sixty-five (65) degrees of rotation. The low poppet valve lift-to-angle of rotation may also provide high anti-backdrive capability that may prevent unwanted valve opening during conditions of high back-pressure and force especially when there is no electrical control signal applied to the EGR valve assembly 200. It should also be appreciated that the initial slope 241 may also provide a desirable low flow resolution near the start-to-open point of the poppet valve 218.

In one embodiment, the linkage mechanism 222 may have the engagement component 223 operably coupled or connected to a driven gear 214 and engaging a slot 231 of a lever 230. It is also within the scope of the invention to reverse these positions wherein the slot 231 may be operably connected to the driven gear 214 and the engagement component 223 may be operably connected to the lever 230. In a similar manner, the positions of the second engagement component 236 may be operably coupled or connected to the lever 230 and the slot 240 of the link 238 may be reversed wherein, the slot 240 may be located in the lever 230 and the second engagement component 236 may be operably coupled or connected to the link 238. It should be appreciated that the location of the engagement component 223, slot 231, second engagement component 236 and slot 240 may in part be determined by factors such as packaging space, component design, cost, manufacturing capability, performance, or other factors.

Referring to FIGS. 17, 18A, 18B, and 19, the EGR valve assembly 200 may also include a return spring 244 that may be coaxial with the output shaft 215 and the output gear 214. The return spring 244 may be operably coupled or connected to the output gear 214 and the first housing 201. The return spring 244 may provide a bias force that will forcibly rotate the output gear 214, engagement component 223, lever 230, and engagement component 236 and may cause the link 238, the valve stem 219, and the poppet valve 218 to move in a valve closing direction 235. The bias force of the return spring 244 must be overcome by the force provided by the D.C. motor 203 and the gear drive assembly 212 before the poppet valve 218 may move in the valve opening direction 233. It should be appreciated that it may be advantageous to minimize the initial bias force of the return spring 244 to avoid increasing the force capability of the D.C. motor 203 and the gear drive assembly 212. It should also be appreciated that the EGR valve assembly 200, shown in FIG. 15, may function in a similar manner to the EGR valve 14 in the EGR system 10 shown in FIG. 1 and previously described herein.

In one embodiment, the D.C. motor 203 and the gear drive assembly 212 provide the rotational force for moving the linkage mechanism 222. It is also within the scope of the present invention to only use an electrical drive device and eliminate the gear drive assembly 212. It should be appreciated that this type of arrangement may be desirable for electrical drive devices, such as a torque motor, that may have a total rotation of three hundred sixty (360) degrees or less.

Figures 23A, 23B:
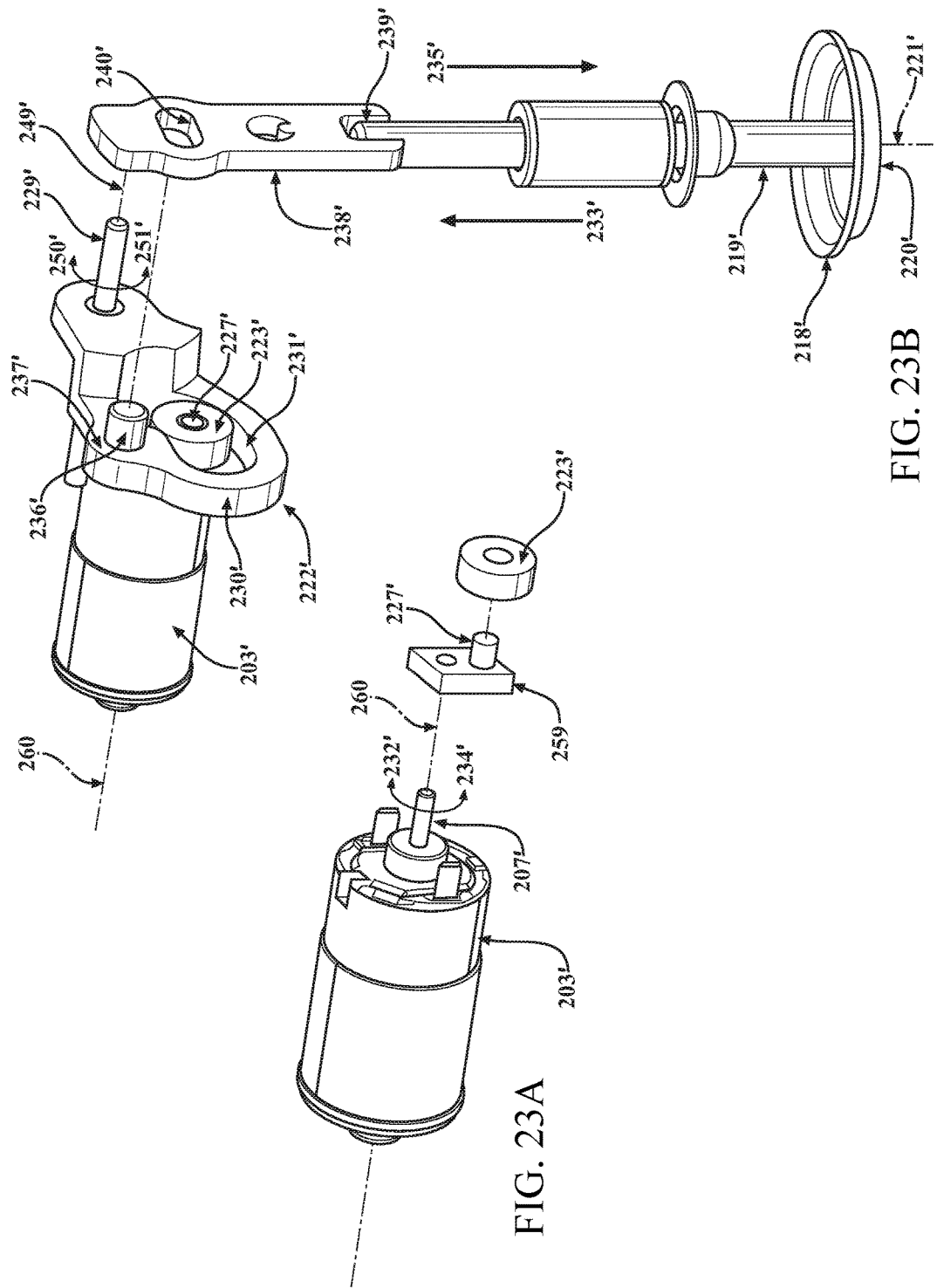
FIGS. 23A and 23B are partially exploded views of another embodiment of a linkage mechanism, according to the present invention, for the EGR valve assembly of FIG. 13.
Figure 24:
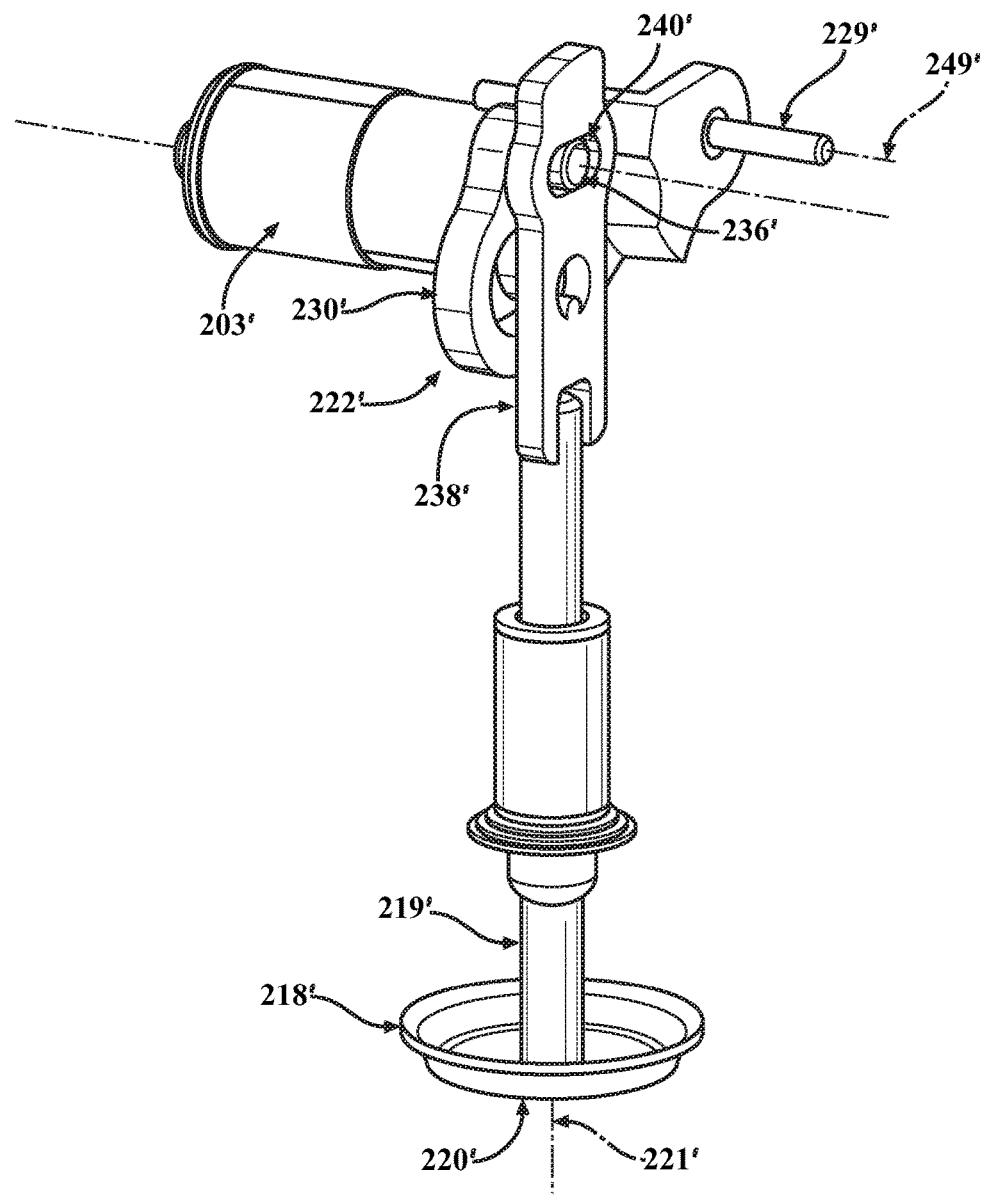
FIG. 24 is a perspective view of the linkage mechanism of FIG. 23.

Referring to FIGS. 23A, 23B, and 24, another embodiment, according to the present invention, of the linkage mechanism 222 shown in FIGS. 18A and 18B is used for the EGR valve assembly 200. Like parts of the linkage mechanism 222 have like reference numerals followed by an apostrophe. In this embodiment of the linkage mechanism 222', the gear drive assembly 212 has been removed and the D.C. motor 203' has been repositioned. The D.C. motor 203' may provide a rotational force in response to an electrical control signal applied to the D.C. motor 203'. A rotatable shaft 207' may be operably coupled to the D.C. motor 203' for translating the rotational force from the D.C. motor 203' to the linkage arrangement 222'. The rotatable shaft 207' has an axis of rotation 260.

Referring to FIGS. 23A, 23B, and 24, the linkage mechanism 222' may include a bar 259 which is operably coupled or connected to and rotatable with the rotatable shaft 207'. The bar 259 may be a separate component operably connected to the rotatable shaft 207' or may be formed as a portion of the rotatable shaft 207'. The bar 259 may be a variety of shapes and sizes including, but not limited to, a round bar, a rectangular bar, a square bar, or other suitable shape. The bar 259 may also be referred to as a lever, a link, or a hub. An engagement component 223' may be operably connected to the bar 259. The engagement component 223' may be at least one of a pin, a sleeve, a roller, a ball bearing, a roller bearing or other suitable engagement component. As illustrated in FIGS. 23A and 23B, the engagement component 223' is a ball bearing which is eccentrically positioned from the rotational axis 260 of the rotatable shaft 207'. The engagement component 223' may be supported on the bar 259 by a pin 227'. The engagement component 223' may be operably coupled or connected to the bar 259 by a number of methods that may be within the scope of the present invention. It should be appreciated that these methods may include, but are not limited to, forming the engagement component 223' as a portion of the bar 259, attaching the engagement component 223' directly to the bar 259, or providing a rotatable connection to the bar 259.

The linkage mechanism 222' may further include a lever 230' which may be coupled to a housing (not shown) by a pin 229'. The pin 229' may allow for rotation of the lever 230' about the axis 249' of the pin 229'. The lever 230' may include a slot 231' for receiving the engagement component 223'. It should be appreciated that FIG. 23 shows a partially exploded view in which some components have been displaced to provide a better view of components of the linkage arrangement 222'.

When the rotatable shaft 207' is forcibly rotated in a first direction 232', the bar 259 and the engagement component 223' may rotate about the axis 260' of the rotatable shaft 207'. The forced rotation of the rotatable shaft 207' in the first direction 232' may cause the engagement component 223' to make contact with a surface of the slot 231' and may force the lever 230' to rotate in a first direction 250' about the axis 249' of the pin 229' and may force the lever 230' to move in a first direction 233' which may be parallel to a longitudinal axis 221' of the valve stem 219'. When the rotatable shaft 207' is forcibly rotated in a second direction 234', the engagement component 223' may contact a surface of slot 231' and may force the lever 230' to rotate in a second direction 251' about the axis 249' of the pin 229' and may force the lever 230' to move in a second opposite direction 235' which is parallel to the longitudinal axis 221' of the valve stem 219'.

The lever 230' may also include a second engagement component 236' that may be at least one of a pin, a sleeve, a roller, a ball bearing, a roller bearing or other suitable engagement component. The second engagement 236' may be operably coupled or connected to the lever 230' and extend from a surface 237' of the lever 230'.

The linkage mechanism 222' may further include a link 238' which may be operably coupled or connected to a second end 239' of valve stem 219' and may be moveable with the valve stem 219'. The link 238' may be a separate component or may be formed as a portion of the second end 239' of the valve stem 219'. The link 238' may include a horizontal slot 240' for receiving the second engagement component 236' of the lever 230'.

In operation of the linkage mechanism 222', when the rotatable shaft 207' is forcibly rotated in the first direction 232', forcing the lever 230' to move in the first direction 233', the second engagement component 236' may contact a surface of the horizontal slot 240' of the link 238' and may force movement of the link 238', the valve stem 219', and the poppet valve 218' in the first direction 233'. When the rotatable shaft 207' is forcibly rotated in the second direction 234', forcing the lever 230' to move in the second direction 235', the second engagement component 236' may contact a surface of the horizontal slot 240' of the link 238' and may force movement of the link 238', the valve stem 219', and the poppet valve 218' in the second direction 235'. The poppet valve 218', also referred to as a valve or valve member, may be connected to a first end 220' of the valve stem 219'. It should be appreciated that the movement of the poppet valve 218' may be used to control fluid flow through a valve assembly, such as the EGR valve assembly 200, as previously described herein.

Accordingly, the linkage mechanism 222, 222' of the present invention can potentially extend the usable range of eccentric rotation to greater than one hundred eighty (180) degrees. The linkage mechanism 222, 222' of the present invention allows an optimal equivalent scotch yoke starting angle over a range of stem/poppet valve axial positions to accommodate variations in the locations of mating parts, for example valve seats. The linkage mechanism 222, 222' of the present invention minimizes side forces on the output or valve stem, due to a zero pressure angle at the stem-slot interface. It should be appreciated that, if the engagement component or pin is located on the stem centerline and the valve stem and lever form a right angle at closed valve, the side scrub is eliminated.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the invention may be practiced other than as specifically described.

What is claimed is:

1. A linkage mechanism for a valve assembly, said linkage assembly comprising: one of a first slot and a first engagement component operably coupled to at least one drive component of the valve assembly and located eccentrically from a rotational axis of the at least one drive component; a link operably coupled to one end of a valve stem of a valve member of the valve assembly and being moveable linearly with the valve stem, the link having a second slot; and a rotatable lever coupled to at least one housing of the valve assembly, the lever including the other of the first slot and the first engagement component and a second engagement component each being located along an axis transverse to a longitudinal axis of the valve stem, wherein the other of the first slot and the first engagement component is operably engaged with the one of the first slot and the first engagement component of the at least one drive component and the other of the second slot and the second engagement component is operably engaged with the second slot of the link, wherein rotation of the at least one drive component causes the lever to rotate to convert a rotational movement of the at least one drive component to a linear movement of the link such that the link, the valve stem, and the valve member are moved linearly in a direction along the longitudinal axis of the valve stem, wherein the link and the valve stem are separate components.

2. The linkage mechanism as set forth in claim 1 wherein the one of the second slot and the second engagement component is located on the longitudinal axis of the valve stem.

3. The linkage mechanism as set forth in claim 2 wherein the lever and the valve stem form a right angle relative to each other when the other of the second slot and the second engagement component is located on the longitudinal axis of the valve stem.

4. The linkage mechanism as set forth in claim 1 wherein the first slot has a predetermined shape that determines a rate of axial movement of the link, the valve stem, and the valve member in a direction along the longitudinal axis of the valve stem.

5. The linkage mechanism as set forth in claim 4 wherein the predetermined shape includes a first portion that is arcuate.

6. The linkage mechanism as set forth in claim 5 wherein the predetermined shape includes a second portion that is transverse to the longitudinal axis of the valve stem.

7. The linkage mechanism as set forth in claim 1 wherein the one of the second slot and the second engagement component is transverse to the longitudinal axis of the valve stem.

8. The linkage mechanism as set forth in claim 1 wherein the first engagement component and the second engagement component is at least one of a pin, a sleeve, a roller, a ball bearing, and a roller bearing.

9. The linkage mechanism as set forth in claim 1 wherein a pressure angle at a point of contact between the second slot and the second engagement component is zero and remains zero as the link, the valve stem, and the valve member are moved in a direction along the longitudinal axis of the valve stem.

10. The linkage mechanism as set forth in claim 1 wherein the at least one drive component is a gear.

11. The linkage mechanism as set forth in claim 1, wherein a total angle of rotation for the linkage mechanism is one hundred ninety (190) degrees.

12. A valve assembly for a vehicle, said valve assembly comprising: at least one housing including an inlet for receiving a fluid and an outlet for delivering a fluid; a valve seat disposed between the inlet and the outlet; a valve member coaxial with the valve seat, the valve member having a first position seated on the valve seat to block fluid flow between the inlet and the outlet and a second position displaced from the valve seat to allow fluid flow between the inlet and the outlet; a valve stem, coaxial with the valve member, having a longitudinal axis and a first end and a second end, the first end being operably coupled to the valve member, the valve stem being supported in the at least one housing for providing axial movement of the valve stem along the longitudinal axis; a drive assembly including a rotatable shaft for receiving and delivering a rotational force, the drive assembly comprising a drive component operably coupled to and rotatable with the rotatable shafts and at least one driven component operably engaged with and rotatable with the drive component; the at least one driven component having one of a first slot and a first engagement component located eccentrically from a rotational axis of the at least one driven component; a link operably coupled to the second end of the valve stem and being moveable linearly with the valve stem, the link having a second slot; and a rotatable lever coupled to the at least one housing, the lever including the other of the first slot and the first engagement component and a second engagement component each being located along an axis transverse to a longitudinal axis of the valve stem, wherein the other of the first slot and the first engagement component is operably engaged with the one of the first slot and the first engagement component of the at least one driven component and the second engagement component is operably engaged with the second slot of the link, wherein rotation of the at least one driven component causes the lever to rotate to convert a rotational movement of the at least one driven component to a linear movement of the link such that the link, the valve stem, and the valve member are moved linearly in a direction along the longitudinal axis of the valve stem, wherein the link and the valve stem are separate components.

13. The valve assembly as set forth in claim 12 wherein the other of the second slot and the second engagement component is located on the longitudinal axis of the valve stem and the lever and the valve stem form a right angle relative to each other when the valve member is in the first position.

14. The valve assembly as set forth in claim 12 wherein a pressure angle at a point of contact between the second slot and the second engagement component is zero and remains zero as the link, the valve stem, and the valve member are moved in a direction along the longitudinal axis of the valve stem.

15. The valve assembly as set forth in claim 12 wherein the first slot has a predetermined shape that determines a rate of axial movement of the link, the valve stem, and the valve member in a direction along the longitudinal axis of the valve stem.

16. The valve assembly as set forth in claim 15 wherein the predetermined shape includes a first portion that is arcuate and a second portion that is transverse to the longitudinal axis of the valve stem.

17. An EGR valve assembly for an EGR system of a vehicle, said EGR valve assembly comprising: at least one housing including an inlet for receiving a fluid and an outlet for delivering a fluid; a valve seat disposed between the inlet and the outlet; a valve member coaxial with the valve seat, the valve member having a first position seated on the valve seat to block fluid flow between the inlet and the outlet and a second position displaced from the valve seat to allow fluid flow between the inlet and the outlet; a valve stem, coaxial with the valve member, having a longitudinal axis and a first end and a second end, the first end being operably coupled to the valve member, the valve stem being supported in the at least one housing for providing axial movement of the valve stem along the longitudinal axis, a gear drive assembly including a rotatable shaft for receiving and delivering a rotational force, the gear drive assembly comprising a drive gear operably coupled to and rotatable with the rotatable shaft and at least one driven gear operably engaged with and rotatable with the drive gear; the at least one driven gear having one of a first slot and a first engagement component located eccentrically from a rotational axis of the at least one driven gear; a link operably coupled to the second end of the valve stem and being moveable linearly with the valve stem, the link having a second slot; a rotatable lever coupled to the at least one housing, the lever including the other of the first slot and the first engagement component and a second engagement component each being located along an axis transverse to a longitudinal axis of the valve stem, wherein the other of the first slot and the first engagement component is operably engaged with the one of the first slot and the first engagement component of the at least one driven gear and the second engagement component is operably engaged with the second slot of the link; wherein the one of the second slot and the second engagement component is located on the longitudinal axis of the valve stem and the lever and the valve stem form a right angle relative to each other when the valve member is in the first position; wherein the first slot has a predetermined shape including a first portion that is generally arcuate and a second portion that is generally transverse to the longitudinal axis of the valve stem that determines a rate of axial movement of the link, the valve stem, and the valve member in a direction along the longitudinal axis of the valve stem; and wherein rotation of the at least one driven gear causes the lever to rotate to convert a rotational movement of the at least one driven gear to a linear movement of the link such that the link, the valve stem, and the valve member are moved axially and linearly in a direction along the longitudinal axis of the valve stem, wherein the link and the valve stem are separate components.

18. A linkage mechanism for a valve assembly, said linkage assembly comprising: one of a first slot and a first engagement component operably coupled to a rotatable shaft and located eccentrically from a rotational axis of the rotatable shaft; a link operably coupled to one end of a valve stem of a valve member of the valve assembly and being moveable linearly with the valve stem, the link having a second slot; and a rotatable lever coupled to at least one housing of the valve assembly, the lever including the other of the first slot and the first engagement component and a second engagement component each being located along an axis transverse to a longitudinal axis of the valve stem, wherein the other of the first slot and the first engagement component is operably engaged with the one of the first slot and the first engagement component of the rotatable shaft and the second engagement component is operably engaged with the second slot of the link, wherein rotation of the rotatable shaft causes the lever to rotate to convert a rotational movement of the rotatable shaft to a linear movement of the link such that the link, the valve stem, and the valve member are moved linearly in a direction along the longitudinal axis of the valve stem, wherein the link and the valve stem are separate components.

* * * * *

UNITED STATES PATENT AND TRADEMARK OFFICE
CERTIFICATE OF CORRECTION

PATENT NO. : 10,473,232 B2
APPLICATION NO. : 15/405630
DATED : November 12, 2019
INVENTOR(S) : Robert J. Telep et al.

It is certified that error appears in the above-identified patent and that said Letters Patent is hereby corrected as shown below:

In the Claims

Claim 1, Column 17, Lines 19-21, please delete "the at least one drive component and the other of the second slot and the second engagement component" and replace with -- the at least one drive component and the second engagement component --

Signed and Sealed this
Tenth Day of March, 2020

Andrei Iancu
*Director of the United States Patent and Trademark Office*